United States Patent
Katoh et al.

(10) Patent No.: US 8,956,451 B2
(45) Date of Patent: Feb. 17, 2015

(54) INK SET AND INKJET RECORDING METHOD

(71) Applicants: Keita Katoh, Shizuoka (JP); Masaki Kudo, Shizuoka (JP); Tomohiro Nakagawa, Kanagawa (JP); Akihiko Gotoh, Kanagawa (JP)

(72) Inventors: Keita Katoh, Shizuoka (JP); Masaki Kudo, Shizuoka (JP); Tomohiro Nakagawa, Kanagawa (JP); Akihiko Gotoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/859,863

(22) Filed: Apr. 10, 2013

(65) Prior Publication Data

US 2013/0271524 A1    Oct. 17, 2013

(30) Foreign Application Priority Data

Apr. 13, 2012    (JP) .................. 2012-091660

(51) Int. Cl.
   C09D 11/02    (2014.01)
   G01D 11/00    (2006.01)
   C09D 11/40    (2014.01)
   C09D 11/324    (2014.01)

(52) U.S. Cl.
   CPC .............. C09D 11/40 (2013.01); C09D 11/324 (2013.01)
   USPC .................. 106/31.6; 106/31.89; 347/100

(58) Field of Classification Search
   USPC ............... 106/31.6, 31.89; 347/100
   See application file for complete search history.

(56) References Cited

U.S. PATENT DOCUMENTS

| | | |
|---|---|---|
| 5,952,048 A | 9/1999 | Tsubuko et al. |
| 6,918,662 B2 | 7/2005 | Arita et al. |
| 7,094,813 B2 | 8/2006 | Namba et al. |
| 7,284,851 B2 | 10/2007 | Bannai et al. |
| 7,490,930 B2 | 2/2009 | Morohoshi et al. |

(Continued)

FOREIGN PATENT DOCUMENTS

| EP | 1 167 046 A1 | 1/2002 |
|---|---|---|
| JP | 2002-327138 | 11/2002 |

(Continued)

OTHER PUBLICATIONS

Extended European Search Report issued Aug. 20, 2013, in Patent Application No. 13163633.4.

Primary Examiner — Veronica F Faison
(74) Attorney, Agent, or Firm — Oblon, Spivak, McClelland, Maier & Neustadt, L.L.P.

(57) ABSTRACT

An ink set, used in an inkjet recording apparatus equipped with a recording head including: a plurality of nozzle arrays, each including a plurality of nozzles; and a sucking-and-covering unit for covering the recording head, wherein the black ink is supplied to one of the plurality of the nozzle arrays of the recording head, and the color ink is supplied to the other plurality of the nozzle arrays of the recording head, wherein the black ink includes resin-coated carbon-black particles, surfactant-treated carbon-black particles and water, wherein the color ink includes resin-coated color-pigment particles, surfactant-treated color-pigment particles and water, and wherein the ink set satisfies Expression (1), Expression (2) and Expression (3) below:

$5.0\%$ by mass $\leq P(Bk) \leq 12.0\%$ by mass    Expression (1)

$3.0\%$ by mass $\leq P(CL) \leq 10.0\%$ by mass    Expression (2)

$[R(CL)/S(CL)] < [R(Bk)/S(Bk)]$    Expression (3).

13 Claims, 6 Drawing Sheets

(56) References Cited

U.S. PATENT DOCUMENTS

| | | |
|---|---|---|
| 7,682,011 B2 | 3/2010 | Namba et al. |
| 7,699,457 B2 | 4/2010 | Namba et al. |
| 7,810,919 B2 | 10/2010 | Kojima et al. |
| 7,892,340 B2 | 2/2011 | Namba et al. |
| 8,029,122 B2 | 10/2011 | Kojima et al. |
| 8,044,114 B2 | 10/2011 | Habashi et al. |
| 8,118,419 B2 | 2/2012 | Morohoshi et al. |
| 8,173,227 B2 | 5/2012 | Morohoshi et al. |
| 8,192,009 B2 | 6/2012 | Yokohama et al. |
| 8,252,207 B2 | 8/2012 | Namba et al. |
| 2002/0044187 A1 | 4/2002 | Koitabashi et al. |
| 2002/0083866 A1 | 7/2002 | Arita et al. |
| 2002/0096085 A1 | 7/2002 | Gotoh et al. |
| 2003/0010252 A1 | 1/2003 | Arita et al. |
| 2003/0064206 A1 | 4/2003 | Koyano et al. |
| 2003/0076394 A1 | 4/2003 | Gotoh et al. |
| 2003/0107632 A1 | 6/2003 | Arita et al. |
| 2005/0007431 A1 | 1/2005 | Koyano et al. |
| 2005/0168552 A1 | 8/2005 | Arita et al. |
| 2006/0258794 A1 | 11/2006 | Gaudet |
| 2009/0135218 A1 | 5/2009 | Morohoshi et al. |
| 2009/0263632 A1 | 10/2009 | Kojima et al. |
| 2010/0020142 A1 | 1/2010 | Bannai et al. |
| 2010/0271435 A1 | 10/2010 | Kojima et al. |
| 2010/0279035 A1 | 11/2010 | Namba et al. |
| 2011/0169889 A1 | 7/2011 | Kojima et al. |
| 2011/0201743 A1 | 8/2011 | Gaudet |
| 2011/0205288 A1 | 8/2011 | Matsuyama et al. |
| 2011/0216123 A1 | 9/2011 | Tamai et al. |
| 2011/0300353 A1 | 12/2011 | Habashi et al. |
| 2011/0310166 A1 | 12/2011 | Namba et al. |
| 2011/0318551 A1 | 12/2011 | Nakagawa |
| 2012/0044293 A1 | 2/2012 | Morohoshi et al. |
| 2012/0062646 A1 | 3/2012 | Hasegawa et al. |
| 2012/0121831 A1 | 5/2012 | Kudoh et al. |
| 2012/0154492 A1 | 6/2012 | Hakiri et al. |
| 2012/0188312 A1 | 7/2012 | Nakagawa |
| 2012/0308785 A1 | 12/2012 | Nakagawa |
| 2012/0320133 A1 | 12/2012 | Namba et al. |
| 2013/0038660 A1 | 2/2013 | Hasegawa et al. |
| 2013/0063524 A1 | 3/2013 | Katoh et al. |

FOREIGN PATENT DOCUMENTS

| | | |
|---|---|---|
| JP | 2005-170035 | 6/2005 |
| JP | 2007-119551 | 5/2007 |
| WO | WO 2010/137745 A1 | 12/2010 |
| WO | WO 2011/030880 A1 | 3/2011 |
| WO | WO 2011/136037 A1 | 11/2011 |

INK SET AND INKJET RECORDING METHOD

BACKGROUND OF THE INVENTION

1. Field of the Invention

The present invention relates to an ink set and an inkjet recording method.

2. Description of the Related Art

In an inkjet recording apparatus, a pigment ink which uses a pigment since it has a feature of superior lightfastness and water resistance. However, in the inkjet recording apparatus which uses the pigment ink, ink discharge failure occurs due to clogging caused by the thickened ink by drying or foreign matter, and there is a problem that stable discharge is not possible. A pigment ink having a high pigment concentration, especially a black ink having a high pigment concentration, which supports high image density desired in recent years, is likely to be thickened by drying, and discharge failure becomes more significant.

Thus, for the purpose of improving discharge stability, an ink set for inkjet including a black ink using either carbon black dispersed in water without a dispersant or carbon black included in a polymer and an ink other than the black ink using a pigment included in a polymer is proposed (for example, see Japanese Patent Application Laid-Open (JP-A) No. 2002-327138). However, with this proposed technology, there is a problem that discharge stability is not sufficient for a high pigment concentration.

Thus, to enable stable discharge for a high pigment concentration, an inkjet recording apparatus equipped with a printing maintenance and recovery unit is proposed (for example, see JP-A No. 2005-170035). The printing maintenance and recovery unit sucks an ink filled in a nozzle by a negative-pressure generating unit communicating with a cap sealing a nozzle surface such as suction pump and then wipes the nozzle surface with a wiping member composed of an elastic plate such as rubber. Thereby, air bubbles in a liquid chamber, a thickened ink, dust and so on are removed, and a stable state for ink discharge is maintained.

However, when viscous inks are being sucked using a common cap in a head including nozzle arrays for discharging different types of inks such as combination of a black ink of carbon black and pigment inks of other colors, only the thickened color pigment ink having a low viscosity compared to the black ink is sucked while the black ink cannot be sucked since the black ink of carbon black is likely to have a higher viscosity. Once non-discharge occurs, a problem occurs that the non-discharge cannot be recovered.

Accordingly, there is being asked at present to provide an ink set which provides a high image density and has superior discharge stability and discharge recovery.

SUMMARY OF THE INVENTION

The present invention aims at solving the above problems in the conventional technologies and at achieving the following objection. That is, the present invention aims at providing an ink set which provides a high image density and has superior discharge stability and discharge recovery.

Means for solving the problems are as follows. That is,

An ink set of the present invention is an ink set, including:

a black ink; and a color ink, wherein the ink set is used in an inkjet recording apparatus, including: a recording head which includes a plurality of nozzle arrays, each including a plurality of nozzles; and at least one sucking-and-covering unit which covers the recording head and communicates with a suction-generating unit, wherein the black ink is supplied to one of the plurality of the nozzle arrays of the recording head, and the color ink is supplied to the other plurality of the nozzle arrays of the recording head, wherein the black ink includes:

resin-coated carbon-black particles including carbon black and a resin existing on a surface of the carbon black;

surfactant-treated carbon-black particles including carbon black and a surfactant existing on a surface of the carbon black; and water, wherein the color ink includes:

resin-coated color-pigment particles including a color pigment a resin existing on a surface of the color pigment;

surfactant-treated color-pigment particles including a color pigment and a surfactant existing on a surface of the color pigment; and water, wherein the ink set satisfies Expression (1), Expression (2) and Expression (3) below:

$$5.0\% \text{ by mass} \leq P(Bk) \leq 12.0\% \text{ by mass} \quad \text{Expression (1)}$$

$$3.0\% \text{ by mass} \leq P(CL) \leq 10.0\% \text{ by mass} \quad \text{Expression (2)}$$

$$[R(CL)/S(CL)] < [R(Bk)/S(Bk)] \quad \text{Expression (3)}$$

where, in Expression (1), $P(Bk)$ represents a carbon black concentration of the black ink; in Expression (2), $P(CL)$ represents a pigment concentration of the color ink; in Expression (3), $R(Bk)$ represents a mass ratio of the carbon black in the resin-coated carbon-black particles to the carbon black in the black ink, $S(Bk)$ represents a mass ratio of the carbon black in the surfactant-treated carbon-black particles to the carbon black in the black ink, $R(CL)$ represents a mass ratio of the color pigment in the resin-coated color-pigment particles to the color pigment in the color ink, and $S(CL)$ represents a mass ratio of the color pigment in the surfactant-treated color-pigment particles to the color pigment in the color ink.

According to the present invention, the conventional problems may be solved, and an ink set which provides high image density and has superior discharge stability and discharge recovery may be provided.

DETAILED DESCRIPTION OF THE INVENTION (Ink Set)

Figure 1:
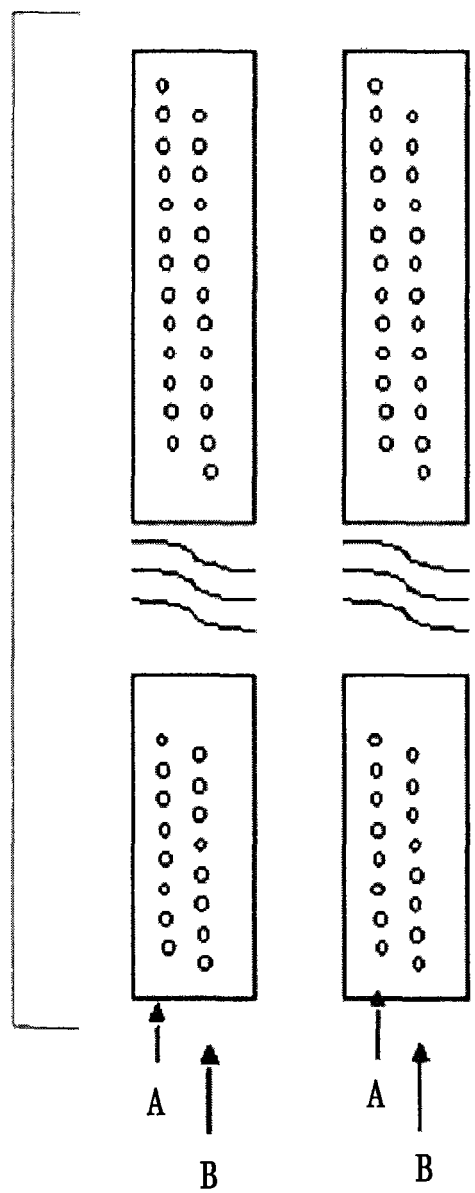
FIG. 1 is a schematic plan view of one example of a recording head as seen from a nozzle surface.

An ink set of the present invention includes a black ink and a color ink, and it further includes other components according to necessity.

The ink set is used in an inkjet recording apparatus equipped with: a recording head which includes a plurality of nozzle arrays including a plurality of nozzles; and at least one sucking-and-covering unit which covers the recording head and communicates with a suction-generating unit.

The black ink and the color ink are respectively supplied to any one of the nozzle arrays of the recording head.

<Black Ink and Color Ink>

The black ink includes resin-coated carbon-black particles, surfactant-treated carbon-black particles and water, and it preferably includes a water-soluble organic solvent, a fluorosurfactant and a silicone surfactant and further includes other components according to necessity.

The color ink includes resin-coated color-pigment particles, surfactant-treated color-pigment particles and water, and it preferably includes a water-soluble organic solvent, a fluorosurfactant and a silicone surfactant and further includes other components according to necessity.

The ink set satisfies Expression (1), Expression (2) and Expression (3) below.

$$5.0\% \text{ by mass} \leq P(Bk) \leq 12.0\% \text{ by mass} \quad \text{Expression (1)}$$

$$3.0\% \text{ by mass} \leq P(CL) \leq 10.0\% \text{ by mass} \quad \text{Expression (2)}$$

$$[R(CL)/S(CL)] < [R(Bk)/S(Bk)] \quad \text{Expression (3)}$$

where, in Expression (1), $P(Bk)$ represents a carbon black concentration of the black ink; in Expression (2), $P(CL)$ represents a pigment concentration of the color ink; in Expression (3), $R(Bk)$ represents a mass ratio of the carbon black in the resin-coated carbon-black particles to the carbon black in the black ink, $S(Bk)$ represents a mass ratio of the carbon black in the surfactant-treated carbon-black particles to the carbon black in the black ink, $R(CL)$ represents a mass ratio of the color pigment in the resin-coated color-pigment particles to the color pigment in the color ink, and $S(CL)$ represents a mass ratio of the color pigment in the surfactant-treated color-pigment particles to the color pigment in the color ink.

It is necessary for a black ink which uses carbon black to have a high pigment concentration compared to a color ink which uses other color pigments in order to achieve sufficient image density. Also, it is usually a case that carbon black itself has a particle diameter larger than a particle diameter of a color pigment. Thus, the black ink which uses carbon black is more likely to be viscous compared to the color ink which uses a color pigment. When a recording head which shares nozzle arrays with other color inks is sealed with an identical cap for sucking viscous inks, only color inks having a lower viscosity is sucked while thickened black ink is not sucked. Once non-discharge occurs, a problem occurs that the non-discharge is not recovered.

The present inventors have obtained the following findings with respect to such a problem.

An ink which uses resin-coated pigment particles including a pigment and a resin existing on a surface of the pigment is slow in thickening when the ink dries in a nozzle compared to an ink which uses surfactant-treated pigment particles including a pigment and a surfactant existing on a surface of the pigment. Also, in an ink which uses the resin-coated pigment particles and the surfactant-treated pigment particles in combination, a thickening speed of the ink in a nozzle is slower for a higher ratio of the resin-coated pigment particles. Thus, in an ink set including a by using a black ink and a color ink which share a cap, by using resin-coated pigment particles and surfactant-treated pigment particles in combination with a ratio of the resin-coated color-pigment particles in the color ink smaller than a ratio of the resin-coated carbon-black particles in the black ink, an ink viscosity difference in a nozzle between the black ink and the color ink when thickened by drying and so on is reduced. This makes suction of the inks by capping easier, and discharge stability and discharge recovery improve.

Also, it eliminates a necessity of reducing a pigment concentration itself in the black ink, and thus sufficient image density of the black ink is also guaranteed.

The present invention is completed based on the findings of the present inventors.

—Resin-Coated Carbon-Black Particles and Resin-Coated Color-Pigment Particles—

The resin-coated carbon-black particles are not particularly restricted as long as they are particles including carbon black and a resin existing on a surface of the carbon black, and they may be appropriately selected according to purpose.

The resin-coated color-pigment particles are not particularly restricted as long as they are particles including a color pigment and a resin existing on a surface of the color pigment, and they may be appropriately selected according to purpose.

Hereinafter, the carbon black and the color pigment may be collectively referred to as "pigments".

Hereinafter, the resin-coated carbon-black particles and the resin-coated color-pigment particles may be collectively referred to as "resin-coated pigment particles".

The resin-coated pigment particles may also be defined as particles in which a pigment is covered with a resin. In the resin-coated pigment particles, it is unnecessary that the pigment is completely covered with the resin; rather, the pigment is at least partially covered with the resin.

—Resin—

The resin is not particularly restricted, and it may be appropriately selected according to purpose. Examples thereof include a polyamide resin, a polyurethane resin, a polyester resin, a polyurea resin, an epoxy resin, a polycarbonate resin, a urea resin, a melamine resin, a phenolic resin, polysaccharides, gelatin, Arabic gum, dextran, casein, natural rubber, carboxypolymethylene, polyvinyl alcohol, polyvinyl pyrrolidone, polyvinyl acetate, polyvinyl chloride, polyvinylidene chloride, cellulose, ethylcellulose, methylcellulose, nitrocellulose, hydroxyethylcellulose, cellulose acetate, polyethylene, polystyrene, polymers or copolymers of (meth)acrylic acid, polymers or copolymers of (meth)acrylic acid ester, copolymers of (meth)acrylic acid-(meth)acrylic acid ester, a styrene-(meth)acrylic acid copolymer, styrene-maleic acid copolymer, sodium alginate, fatty acids, paraffin, beeswax, water wax, hardened tallow, carnauba wax, albumin and so on.

Also, examples of the resin includes: a resin containing an anionic group such as carboxylic acid group, sulfonic acid group and so on; and a resin containing a nonionic group; and so on. Examples of the resin containing a nonionic group include: homopolymers of polyethylene glycol monomethacrylate, polypropylene glycol monomethacrylate or methoxypolyethylene glycol monomethacrylate and copolymers thereof; cationic ring-opening polymers of polyvinyl alcohol or 2-oxazoline; and so on.

An amount of the resin in the resin-coated pigment particles is not particularly restricted, and it may be appropriately selected according to purpose. Nonetheless, it is preferably 10% by mass to 90% by mass, and more preferably 20% by mass to 70% by mass with respect to the pigment. When the amount of the resin is less than 10% by mass, there are cases where a coating effect cannot be obtained. When the amount exceeds 90% by mass, there are cases where color development of the pigment decreases. When the amount of the resin is within the preferable range, it is possible to suppress the decrease of color development of the pigment since a content of the resin in the resin-coated pigment particles is relatively small. When the amount of the resin is within the more preferable range, it is possible to suppress the decrease of color development of the pigment since a part of the pigment is substantially exposed without being covered. In addition, since a part of the pigment is substantially exposed without being covered, it is possible to obtain an effect of the pigment being covered. Here, "substantially exposed" means that intentional exposure rather than partial exposure due to defects such as pin holes, cracks and so on.

A method for covering the pigment with the resin is not particularly restricted, may be appropriately selected according to purpose. Examples thereof include a chemical process, a physical process, a physicochemical method, a mechanical process and so on. Specific examples thereof include an acid-precipitation method, a phase-inversion method, an interfacial-polymerization method, an in-situ polymerization method, an in-liquid cured-coating method, a coacervation (phase-separation) method, an in-liquid drying method, a fusion-dispersion-cooling method, an in-air suspension-coating method, a spray-drying method and so on. Among these, the in-liquid drying method, the acid-precipitation method and the phase-inversion method are preferable.

The in-liquid drying method is not particularly restricted, and it may be appropriately selected according to purpose. For example, a dispersion liquid in which a pigment is dispersed in an organic solvent solution with a dissolved resin is prepared. Water is added to this dispersion liquid to form a composite emulsion, and the organic solvent in which the resin is dissolved is gradually removed. Thereby, the pigment is coated with the resin.

The phase-inversion method is not particularly restricted, and it may be appropriately selected according to purpose. For example, an organic solvent phase is prepared as a mixture of an anionic group-containing resin having a self-dispersing ability or dissolving ability in water and the pigment or as a mixture of the pigment, a curing agent and an anionic group-containing resin. By adding water into the organic solvent phase or by adding the organic solvent phase into water, the pigment is covered with the resin while self-dispersing (phase-inversion emulsion).

The acid-precipitation method is not particularly restricted, and it may be appropriately selected according to purpose. For example, a wet cake is obtained by a step of kneading an anionic group-containing resin whose anionic group is partially or totally neutralized with a basic compound and the pigment in an aqueous medium and a step of precipitating the anionic group-containing resin by adjusting the pH to neutral or acidic with an acidic compound so as to fix it on the pigment. The anionic group of the wet cake is partially or totally neutralized using a basic compound, and thereby the pigment is covered with the resin.

—Carbon Black—

The carbon black is not particularly restricted and may be appropriately selected according to purpose.

A method for manufacturing the carbon black is not particularly restricted, and it may be appropriately selected according to purpose. Examples thereof include a furnace method, a channel method and so on.

As the carbon black, commercial products may be used. Examples of the commercial products include No. 2300, No. 900, MCF-88, No. 33, No. 40, No. 45, No. 52, MA7, MA8, MA100, No. 2200B (all manufactured by Mitsubishi Chemical Corporation), RAVEN 700, 5750, 5250, 5000, 3500, 1255 (all manufactured by Columbian Chemicals Company), REGAL 400R, 330R, 660R, MOGULL, MONARCH 700, 800, 880, 900, 1000, 1100, 1300, MONARCH1400 (all manufactured by Cabot), COLOR BLACK FW1, FW2, FW2V, FW18, FW200, S150, S160, S170 (all manufactured by Degussa), PRINTEX 35, U, V, 140U, 140V (all manufactured by Degussa), SPECIAL BLACK 6, 5, 4A, 4 (all manufactured by Degussa) and so on.

A size of the carbon black is not particularly restricted, and it may be appropriately selected according to purpose. Nonetheless, an average primary particle diameter thereof is preferably 15 nm to 40 nm.

A specific surface area of the carbon black is not particularly restricted, may be appropriately selected according to purpose. Nonetheless, a BET specific surface area thereof is preferably 50 $m^2$/g to 300 $m^2$/g.

—Color Pigment—

The color pigment is not particularly restricted, and it may be appropriately selected according to purpose. Examples thereof include yellow pigments, magenta pigments, cyan pigments and so on.

The yellow pigments are not particularly restricted and may be appropriately selected according to purpose. Examples thereof include C. I. Pigment Yellow 1 (Fast Yellow G), 2, 3, 12 (Disazo Yellow AAA), 13, 14, 16, 17, 20, 23, 24, 34, 35, 37, 42 (yellow iron oxide), 53, 55, 73, 74, 75, 81, 83 (Disazo Yellow HR), 86, 93, 95, 97, 98, 100, 101, 104, 108, 109, 110, 114, 117, 120, 125, 128, 129, 137, 138, 139, 147, 148, 150, 151, 153, 154, 155, 166, 168, 180, 185 and so on.

The magenta pigments are not particularly restricted and may be appropriately selected according to purpose. Examples thereof include C. I. Pigment Red 1, 2, 3, 5, 7, 9, 12, 17, 22 (Brilliant Fast Scarlet), 23, 31, 38, 48:1 (Permanent Red 2B (Ba)), 48:2 (Permanent Red 2B(Ca)), 48:3 (Permanent Red 2B(Sr)), 48:4 (Permanent Red 2B (Mn)), 49:1, 52:2, 53:1, 57:1 (Brilliant Carmine 6B), 60:1, 63:1, 63:2, 64:1, 81 (Rhodamine 6G Lake), 83, 88, 92, 97, 101 (colcothar), 104, 105, 106, 108 (cadmium red), 112, 114, 122 (dimethylquinacridone), 123, 146, 149, 166, 168, 170, 172, 175, 176, 178, 179, 180, 184, 185, 190, 192, 193, 202, 209, 215, 216, 217, 219, 220, 223, 226, 227, 228, 238, 240, 254, 255, 272 and so on.

The cyan pigments are not particularly restricted and may be appropriately selected according to purpose. Examples thereof include C. I. Pigment Blue 1, 2, 3, 15 (Copper Phthalocyanine Blue R), 15:1, 15:2, 15:3 (Phthalocyanine Blue G), 15:4, 15:6 (Phthalocyanine Blue E), 16, 17:1, 22, 56, 60, 63, 64, Vat Blue 4, Vat Blue 60 and so on.

In addition, examples of pigments for neutral colors (red, green or blue) include C. I. Pigment Red 177, 194, 224, C. I. Pigment Orange 16, 36, 43, 51, 55, 59, 61, 71, C. I. Pigment Violet 3, 19, 23, 29, 30, 37, 40, 50, C.I. Pigment Green 7, 36 and so on.

A volume-average particle diameter of the pigment is not particularly restricted, and it may be appropriately selected according to purpose. Nonetheless, it is preferably 10 nm to 150 nm, more preferably 20 nm to 100 nm, and particularly preferably 30 nm to 80 nm. When the volume-average particle diameter is less than 10 nm, there are tendencies of decreasing lightfastness as well as degrading storage stability. When the volume-average particle diameter exceeds 150 nm, there are cases where a printed image has decreased color saturation, a stored ink thickens and aggregates, causing nozzles to clog during printing.

The volume-average particle diameter means a 50-% average particle diameter (D50) measured at 23° C., for example, by MICROTRAC UPA-150 manufactured by Nikkiso Co., Ltd. using a sample diluted with pure water such that a pigment concentration in the measurement sample is 0.01% by mass under conditions of particle refractive index of 1.51, particle density of 1.4 g/cm$^3$ and parameters of pure water as solvent parameters.

—Surfactant-Treated Carbon-Black Particles and Surfactant-Treated Color-Pigment Particles—

The surfactant-treated carbon-black particles are not particularly restricted as long as they are particles including carbon black and a surfactant existing on a surface of the carbon black, and they may be appropriately selected according to purpose.

The surfactant-treated color-pigment particles are not particularly restricted as long as they are particles including color pigment and a surfactant existing on a surface of the color pigment, and they may be appropriately selected according to purpose.

Hereinafter, the surfactant-treated carbon-black particles and the surfactant-treated color-pigment particles may be collectively referred to as "surfactant-treated pigment particles".

The surfactant-treated pigment particles may be obtained by treating the pigment with the surfactant. Specifically, for example, they are obtained by dispersing the pigment in water using the surfactant.

Examples of the pigment include the carbon black, the color pigment and so on.

—Surfactant—

The surfactant is not particularly restricted, may be appropriately selected according to purpose. Examples thereof include a nonionic surfactant, an anionic surfactant, an amphoteric surfactant and so on.

The nonionic surfactant is not particularly restricted and may be appropriately selected according to purpose. Examples thereof include: polyoxyethylene alkyl ether such as polyoxyethylene lauryl ether, polyoxyethylene myristyl ether, polyoxyethylene cetyl ether, polyoxyethylene stearyl ether, polyoxyethylene oleyl ether and so on; polyoxyethylene alkylphenyl ether such as polyoxyethylene octylphenyl ether, polyoxyethylene nonylphenyl ether and so on; polyoxyethylene-α-naphthyl ether, polyoxyethylene-β-naphthyl ether, polyoxyethylene monostyrylphenyl ether, polyoxyethylene distyrylphenyl ether, polyoxyethylene alkylnaphthyl ether, polyoxyethylene monostyrylnaphthyl ether, polyoxyethylene distyrylnaphthyl ether and so on.

Also, surfactants such as polyoxyethylene-polyoxypropylene block copolymers with the polyoxyethylene in these surfactants partially substituted by polyoxypropylene or surfactants that compounds including an aromatic ring such as polyoxyethylene alkylphenyl ether and so on are condensed by formalin and so on may be used as well.

An HLB value of the non-ionic surfactant is not particularly restricted, and it may be appropriately selected according to purpose. Nonetheless, it is preferably 12.0 to 19.5, and more preferably 13.0 to 19.0. When the HLB value is 12.0 or greater, the surfactant does not fit well in a dispersion medium, and thus dispersion stability does not degrade. When the HLB value is 19.5 or less, the surfactant is hardly adsorbed to the pigment, and thus dispersion stability does not degrade.

The anionic surfactant is not particularly restricted, and it may be appropriately selected according to purpose. Examples thereof include polyoxyethylene alkyl ether sulfate, polyoxyethylene alkylphenyl ether sulfate, polyoxyethylene monostyrylphenyl ether sulfate, polyoxyethylene distyrylphenyl ether sulfate, polyoxyethylene alkyl ether phosphate, polyoxyethylene alkylphenyl ether phosphate, polyoxyethylene monostyrylphenyl ether phosphate, polyoxyethylene distyrylphenyl ether phosphate, polyoxyethylene alkyl ether carboxylate, polyoxyethylene alkylphenyl ether carboxylate, polyoxyethylene monostyrylphenyl ether carboxylate, polyoxyethylene distyrylphenyl ether carboxylate, naphthalene sulfonate formalin condensates, melanin sulfonate formalin condensates, ester salts of dialkylsulfosuccinic acid, di-salts of alkyl sulfosuccinate, di-salts of polyoxyethylene alkylsulfosuccinic acid, alkylsulfoacetate, α-olefinsulfonate, alkylbenzenesulfonate, alkylnaphthalene sulfonate, alkylsulfonate, N-acylamino acid salts, acylated peptides, soaps and so on.

Metals used for these salts are not particularly restricted, and they may be appropriately selected according to purpose. Examples thereof include potassium, sodium, magnesium, calcium and so on.

A method for obtaining the surfactant-treated pigment particles is not particularly restricted, and it may be appropriately selected according to purpose. Examples thereof include a method of dispersing a mixture of the pigment, the surfactant and water in a mill.

An amount of the surfactant to obtain the surfactant-treated pigment particles is not particularly restricted, and it may be appropriately selected according to purpose. Nonetheless, it is preferably 10% by mass to 50% by mass with respect to the pigment. When the amount is 10% by mass or greater, storage stability of the pigment dispersion and the ink does not decrease, and the dispersion does not take an extremely long time. When the amount is 50% by mass or less, a viscosity of the ink does not increase excessively, and thus discharge stability does not decrease.

A concentration of the carbon black in the black ink [P(Bk)] is not particularly restricted as long as it satisfies Expression (1), and it may be appropriately selected according to purpose. Nonetheless, it is preferable to satisfy Expression (4) below, and it is more preferable to satisfy Expression (4') below.

$$7.0\% \text{ by mass} \leq P(Bk) \leq 10.0\% \text{ by mass} \qquad \text{Expression (4)}$$

$$7.6\% \text{ by mass} \leq P(Bk) \leq 8.5\% \text{ by mass} \qquad \text{Expression (4')}$$

With the P(Bk) satisfying Expression (4'), discharge recovery is superior, and image density of the black ink is superior.

A concentration of the color pigment in the color ink [P(CL)] is not particularly restricted as long as it satisfies Expression (2), and it may be appropriately selected according to purpose. Nonetheless, it is preferable to satisfy Expression (5) below, and it is more preferable to satisfy Expression (5') below.

$$4.0\% \text{ by mass} \leq P(CL) \leq 9.0\% \text{ by mass} \qquad \text{Expression (5)}$$

$$5.0\% \text{ by mass} \leq P(CL) \leq 9.0\% \text{ by mass} \qquad \text{Expression (5')}$$

With the P(CL) satisfying Expression (5'), discharge stability is superior, and image density of the color ink is superior.

A relationship among the resin-coated carbon-black particles, the surfactant-treated carbon-black particles, the resin-coated color-pigment particles and the surfactant-treated color-pigment particles in the ink set is not particularly restricted as long as Expression (3) is satisfied, and it may be appropriately selected according to purpose. Nonetheless, it is preferable that Expression (3') below is satisfied, and it is more preferable that Expression (6) below and Expression (7) below are simultaneously satisfied.

$$0.01 < [R(CL)/S(CL)] < [R(Bk)/S(Bk)] < 100 \quad \text{Expression (3')}$$

$$0.02 < [R(CL)/S(CL)] < 1.00 \quad \text{Expression (6)}$$

$$1.00 < [R(Bk)/S(Bk)] < 10.00 \quad \text{Expression (7)}$$

Further, it is especially preferable that Expression (6') below and Expression (7') below are simultaneously satisfied.

$$0.05 < [R(CL)/S(CL)] < 0.50 \quad \text{Expression (6')}$$

$$2.00 < [R(Bk)/S(Bk)] < 8.00 \quad \text{Expression (7')}$$

With Expression (6') and Expression (7') simultaneously satisfied, image density and discharge stability are superior.

—Water-Soluble Organic Solvent—

The black ink and the color ink uses water as a medium, and a water-soluble organic solvent is preferably included for the purposes of preventing drying of the ink (as a wetting agent) and improving dispersion stability of the pigment.

The water-soluble organic solvent is not particularly restricted, and it may be appropriately selected according to purpose. Nonetheless, it is preferably a polyhydric alcohol, which has an equilibrium moisture content in an environment having a temperature of 23° C. and a relative humidity of 80% of 40% by mass or greater. Such a polyhydric alcohol is not particularly restricted, and it may be appropriately selected according to purpose. Nonetheless, a wetting agent A having a boiling point at a normal temperature exceeding 250° C. and a wetting agent B having a boiling point at a normal temperature of 140° C. or greater and less than 250° C. are preferably used in combination.

Examples of the wetting agent A include 1,2,3-butanetriol, 1,2,4-butanetriol (bp: 190° C. to 191° C./24 hPa), glycerin (bp: 290° C.), diglycerin (bp: 270° C./20 hPa), triethylene glycol (bp: 285° C.), tetraethylene glycol (bp: 324° C. to 330° C.) and so on.

Examples of the wetting agent B include diethylene glycol (bp: 245° C.), 1,3-butanediol (bp: 203° C. to 204° C.) and so on.

Both the wetting agent A and the wetting agent B are hygroscopic materials having an equilibrium moisture content of 40% by mass or greater in an environment having a temperature of 23° C. and a relative humidity of 80%. Here, the wetting agent B is relatively more evaporative than the wetting agent A. When the wetting agent A and the wetting agent B are used in combination, a ratio B/A of the wetting agent A and the wetting agent B (mass ratio) cannot be unambiguously determined since it depends on an excess amount of a wetting agent C described hereinafter and types and amounts of other additives such as penetrating agent and so on, but it is preferably 10/90 to 90/10.

Regarding the equilibrium moisture content, a temperature and pressure in a desiccator was maintained at a temperature of 23±1° C. and a relative humidity of 80±3% using a saturated aqueous solution of potassium chloride, a dish on which 1 g of each water-soluble organic solvent was weighed was stored in this desiccator, and the equilibrium moisture content may be obtained from a saturated moisture content.

Saturated moisture content (%)=(moisture content absorbed by the water-soluble organic solvent/water-soluble organic solvent)×100

In the black ink and the color ink, other than the wetting agent A and the wetting agent B, partially in place of the wetting agent A and the wetting agent B, or in addition to the wetting agent A and the wetting agent B, a wetting agent C other than the wetting agent A and the wetting agent B may be used in combination according to necessity.

Examples of the wetting agent C include polyhydric alcohol other than the wetting agent A and the wetting agent B, polyhydric alcohol alkyl ethers, polyhydric alcohol aryl ethers, nitrogen-containing heterocyclic compounds, amides, amines, sulfur-containing compounds, propylene carbonate, ethylene carbonate, other wetting agents and so on.

Examples of the polyhydric alcohol include dipropylene glycol (bp: 232° C.), 1,5-pentanediol (bp: 242° C.), 3-methyl-1,3-butanediol (bp: 203° C.), propylene glycol (bp: 187° C.), 2-methyl-2,4-pentanediol (bp: 197° C.), ethylene glycol (bp: 196° C. to 198° C.), tripropylene glycol (bp: 267° C.), hexylene glycol (bp: 197° C.), polyethylene glycol (viscous liquid to solid), polypropylene glycol (bp: 187° C.), 1,6-hexanediol (bp: 253° C. to 260° C.), 1,2,6-hexanetriol (bp: 178° C.), trimethylolethane (solid; mp 199° C. to 201° C.), trimethylolpropane (solid; mp: 61° C.) and so on.

Examples of the polyhydric alcohol alkyl ethers include ethylene glycol monoethyl ether (bp: 135° C.), ethylene glycol monobutyl ether (bp: 171° C.), diethylene glycol monomethyl ether (bp: 194° C.), diethylene glycol monobutyl ether (bp: 231° C.), ethylene glycol mono-2-ethylhexyl ether (bp: 229° C.), propylene glycol monoethyl ether (bp: 132° C.) and so on.

A content of the water-soluble organic solvent in each of the black ink and the color ink is not particularly restricted, and it may be appropriately selected according to purpose. Nonetheless, it is preferably 10% by mass to 50% by mass.

—Fluorosurfactant and Silicone Surfactant—

Incorporation of surfactants in the ink decreases a surface tension thereof and fastens a penetration into a recording medium such as paper after ink droplets land on the recording medium, and accordingly, feathering and color bleed may be reduced.

Among the surfactants, a fluorosurfactant and a silicone surfactant are preferable, and use of the fluorosurfactant and the silicone surfactant in combination is preferable in terms of superior image density, discharge stability and discharge recovery.

The fluorosurfactant is not particularly restricted, and it may be appropriately selected according to purpose. Examples thereof include perfluoroalkyl sulfonate, perfluoroalkyl carboxylate, perfluoroalkyl phosphate ester, perfluoroalkyl ethylene oxide adduct, perfluoroalkyl betaine, perfluoroalkyl amine oxide compounds, polyoxyethylene perfluoroalkyl ether and so on.

As the fluorosurfactant, commercial products may be used. Examples of the commercial products include SURFLON S-111, S-112, S-113, S121, S131, S132, S-141, S-144, S-145 (all manufactured by Asahi Glass Co., Ltd.), FLUORAD FC-93, FC-95, FC-98, FC-129, FC-135, FC-170C, FC-430, FC-431, FC-4430 (all manufactured by Sumitomo 3M Ltd.), MEGAFACE F-470, F-1405, F474 (manufactured by DIC Corporation), ZONYL FSN, FSN-100, FSO, FSO-100, FS-300 (all manufactured by DuPont Co.), EFTOP EF-351, 352, 801, 802 (all manufactured by Jemco Co., Ltd.), FT-250, 251 (all manufactured by Neos Company Ltd.), PF-151N, PF-136A, PF-156A (all manufactured by OMNOVA Solutions Inc.) and so on. Among these, ZONYL FSO, FSO-100, FSN, FSN-100, FS-300 manufactured by DuPont Co. are preferable since they provide favorable print quality and storage stability.

The silicone surfactant is not particularly restricted, and it may be appropriately selected according to purpose. Examples thereof include a polyether-modified silicone compound and so on.

Examples of the polyether-modified silicone compound include: a side-chain type (pendant type) that a polyether group is introduced in a side chain of a polysiloxane; a one-end type that a polyether group is introduced at one end of a polysiloxane or a both-end type (ABA type) that a polyether group is introduced at both ends; a side-chain at both ends type that a polyether group is introduced at a side chain and both ends of a polysiloxane; an ABn type that a polysiloxane (A) with an introduction of a polyether group and a polysiloxane (B) without an introduction thereof are bound repeatedly; a branched type that a polyether group is introduced at an end of a branched polysiloxane; and so on.

As the polyether-modified silicone compound, the side-chain type (pendant type) that a polyether group is introduced in a side chain of a polysiloxane is preferable. The polyether-modified silicone compound of the side-chain type is not particularly restricted, and it may be appropriately selected according to purpose.

Nonetheless, a silicone compound represented by General Formula (I) below is preferable since it functions to reduce a surface tension of the ink as well as it functions as an anti-adhesive agent to prevent the ink from being fixed on a nozzle plate of a head.

General Formula (1)

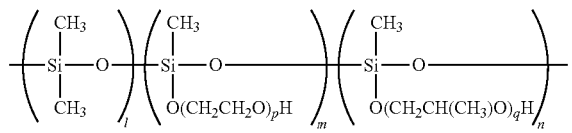

Here, in General Formula (I), l, m, n, p and q are natural numbers (excluding 0), satisfying l+m+n<2,000 and p+q<100.

As the silicone surfactant, commercial products may be used. Examples of the commercial products include KF-351A, KF-352A, KF-353 (the silicone surfactant represented by General Formula (I)), KF-354L, KF-355A, KF-615A, KF-945, KF-618, KF-6011, KF-6015, KF-6004 (all manufactured by Shin-Etsu Chemical Co., Ltd.), SF-3771, SF-8427, SF-8428, SH-3749, SH-8400, FZ-2101, FZ-2104, FZ-2118, FZ-2203, FZ-2207, L-7604 (all manufactured by Dow Corning Toray Co., Ltd.), BYK-345, BYK-346, BYK-348 (all manufactured by BYK Japan KK) and so on.

A content of the fluorosurfactant in each of the black ink and the color ink is not particularly restricted, may be appropriately selected according to purpose. Nonetheless, it is preferably 0.1% by mass to 3.0% by mass, and more preferably 0.3% by mass to 1.0% by mass. The content being in the more preferable range is advantageous in view of superior image density and discharge recovery.

A content of the silicone surfactant in each of the black ink and the color ink is not particularly restricted, may be appropriately selected according to purpose. Nonetheless, it is preferably 0.05% by mass to 0.3% by mass. The content being in the preferable range is advantageous in view of superior discharge stability.

—Other Components—

Examples of the other components include a defoamer, a pH adjuster, an antiseptic and fungicide, a rust inhibitor, an antioxidant, an ultraviolet absorber and so on.

Examples of the defoamer include a silicone defoamer, a polyether defoamer, a fatty acids ester defoamer and so on.

The pH adjuster is not particularly restricted as long as it can adjust a pH to 7 or greater, and it may be appropriately selected according to purpose. Examples thereof include diethanolamine, triethanolamine, lithium carbonate, sodium carbonate, potassium carbonate, ammonium hydroxide, lithium hydroxide, sodium hydroxide, potassium hydroxide and so on.

Examples of the antiseptic and fungicide include 1,2-benzisothiazolin-3-one, sodium dehydroacetate, sodium sorbate, sodium 2-pyridinethiol-1-oxide, sodium benzoate, sodium pentachlorophenol and so on.

Examples of the rust inhibitor include acid sulfite, sodium thiosulfate, ammonium thiodiglycolate, diisopropylammonium nitrite, pentaerythritol tetranitrate, nitrous acid dicyclohexylammonium salt and so on.

Examples of the antioxidant include phenol-based antioxidants (including hindered phenol-based antioxidants), amine-based antioxidants, sulfur-based antioxidants, phosphorus-based antioxidants and so on.

Examples of the ultraviolet absorber include oxybenzone, phenyl salicylate, para-aminobenzoic acid ester and so on.

—Ink Viscosity—

A viscosity of the black ink and the color ink is not particularly restricted, and it may be appropriately selected according to purpose. Nonetheless, the viscosity at 25° C. is preferably 5.0 mPa·s to 12.0 mPa·s. The viscosity may be measured using, for example, a viscometer, RE80L, manufactured by Toki Sangyo Co., Ltd.

(Inkjet Recording Method and Inkjet Recording Apparatus)

An inkjet recording method of the present invention includes an ink-flying step it preferably includes a suction-generating step and a sucking-and-covering step, and it further includes other steps according to necessity.

An inkjet recording apparatus of the present invention includes an ink-flying unit, it preferably includes a suction-generating unit and a sucking-and-covering unit, and it further includes other units according to necessity.

The inkjet recording method may be favorably carried out by the inkjet recording apparatus; the ink-flying step may be favorably carried out by the ink-flying unit; the suction-generating step may be favorably carried out by the suction-generating unit; the sucking-and-covering step may be favorably carried out by the sucking-and-covering unit; the other steps may be favorably carried out by the other units.

<Ink-Flying Step and Ink-Flying Unit>

The ink-flying step is not particularly restricted as long as it is a step for forming an image by applying a stimulus to each ink in the ink set of the present invention and flying the ink. It may be appropriately selected according to purpose, and it may be carried out using the ink-flying unit, for example.

The ink-flying unit is not particularly restricted as long as it is a unit for forming an image by applying a stimulus to each ink in the ink set of the present invention and flying the ink. It may be appropriately selected according to purpose, and examples thereof include a continuous-injection type, an on-demand type and so on. Examples of the on-demand type include a piezo system, a thermal system, an electrostatic system and so on. Among these, the piezo system and the thermal system are particularly preferable.

Specifically, the ink-flying unit preferably includes a liquid chamber, a fluid-resistance portion, a diaphragm, a nozzle member and so on, and it is preferable that at least a part of the liquid chamber, the fluid-resistance portion, the diaphragm and the nozzle member is formed of a material including silicon or nickel, or both thereof.

Also, the inkjet nozzle has a nozzle diameter of preferably 30 μm or less, and preferably 1 μm to 20 μm.

<Suction-Generating Step and Suction-Generating Unit>

The suction-generating step is not particularly restricted as long as it is a step for generating suction for sucking an ink in nozzles in the sucking-and-covering step, and it may be appropriately selected according to purpose. For example, it may be carried out by the suction-generating unit.

The suction-generating unit is not particularly restricted as long as it is a unit for generating suction for sucking an ink in nozzles in the sucking-and-covering unit, and it may be appropriately selected according to purpose. Examples thereof include a suction pump and so on.

<Sucking-and-Covering Step and Sucking-and-Covering Unit>

The sucking-and-covering step is not particularly restricted as long as it is a step of covering a recording head including a plurality of nozzle arrays, each including a plurality of nozzles, and sucking an ink in the nozzles, and it may be appropriately selected according to purpose. For example, it may be carried out by the sucking-and-covering unit.

The sucking-and-covering unit is not particularly restricted as long as it is a unit for covering a recording head including a plurality of nozzle arrays, each including a plurality of nozzles, and sucking an ink in the nozzles, and it may be appropriately selected according to purpose. Examples thereof include a suction cap and so on.

<Other Steps and Other Units>

Examples of the other steps include a stimulus-generating step, a control step and so on.

Examples of the other units include a stimulus-generating unit, a control unit and so on.

—Stimulus-Generating Step and Stimulus-Generating Unit—

The stimulus-generating step is not particularly restricted as long as it is a step to generate a stimulus for flying the ink, and it may be appropriately selected according to purpose. For example, it may be carried out by the stimulus-generating unit.

Examples of the stimulus-generating unit include a heating device, a pressurizing device, a piezoelectric element, a vibration generator, an ultrasonic oscillator, a light and so on, and specific examples thereof include: a piezo actuator such as piezoelectric element and so on; a thermal actuator which makes use of a phase change by film boiling of a liquid using an electrothermal conversion element such as heating resistor and so on; a shape-memory-alloy actuator which makes use of changes in a metal phase due to temperature changes; and an electrostatic actuator which makes use of an electrostatic force; and so on.

The stimulus is not particularly restricted, and it may be appropriately selected according to purpose. Examples thereof include heat (temperature), pressure, vibration, light and so on. These may be used alone or in combination of two or more. Among these, heat and pressure are preferable.

An aspect of flight of the ink is not particularly restricted, and it varies depending on the types of the stimulus and so on. As an exemplary method, in a case where the stimulus is "heat", a thermal energy corresponding to a recording signal is applied to the ink in the recording head using, for example, a thermal head and so on; thereby, air bubbles are generated by the thermal energy in the ink, and by the pressure of the air bubbles, the ink is discharged and jetted from nozzle holes of the recording head as liquid droplets. Also, in a case where the stimulus is "pressure", for example, a voltage is applied on a piezoelectric element bonded in a position called a pressure chamber located in an ink flow path in the recording head, which deflects the piezoelectric element and reduces a volume of the pressure chamber, and thereby the ink is discharged and jetted from nozzle holes of the recording head as liquid droplets.

Regarding the liquid droplets of the ink being flown, a size thereof is not particularly restricted, and it may be appropriately selected according to purpose. Nonetheless, it is preferably 3 pL to 40 pL. A speed of a discharge jet thereof is preferably 5 m/s to 20 m/s, a drive frequency thereof is preferably 1 kHz or greater, and a resolution thereof is preferably 300 dpi or greater.

—Control Step and Control Unit—

The control step is not particularly restricted as long as it is a step for controlling the steps, and it may be appropriately selected according to purpose. It may be carried out by the control unit, for example.

The control unit is not particularly restricted as long as it is a unit for controlling the steps, and it may be appropriately selected according to purpose. Examples thereof include devices such as sequencer, computer and so on.

The inkjet recording apparatus may include a maintenance/recovery apparatus.

The maintenance/recovery apparatus includes: at least one sucking-and-covering unit (suction cap) which covers the recording head and which communicates with the suction-generating unit; and at least one non-sucking-and-covering unit (moisturizing cap) which covers the recording head and which does not communicate with the suction-generating unit, and it further includes other units according to necessity. As described, inclusion of the suction cap and the moisturizing cap reduces an amount of ink spent for a maintenance operation for ensuring reliability compared to a configuration that all the caps are suction caps, and it is possible to prevent the time and the ink spend for the maintenance operation from being wasted.

The maintenance/recovery apparatus is not particularly restricted, and it may be appropriately selected according to purpose. Nonetheless, for example, those disclosed in JP-A No. 2005-170035 and so on may be used.

Hereinafter, one example of the inkjet recording method of the present invention and the inkjet recording apparatus of the present invention is explained using drawings.

Figure 2:
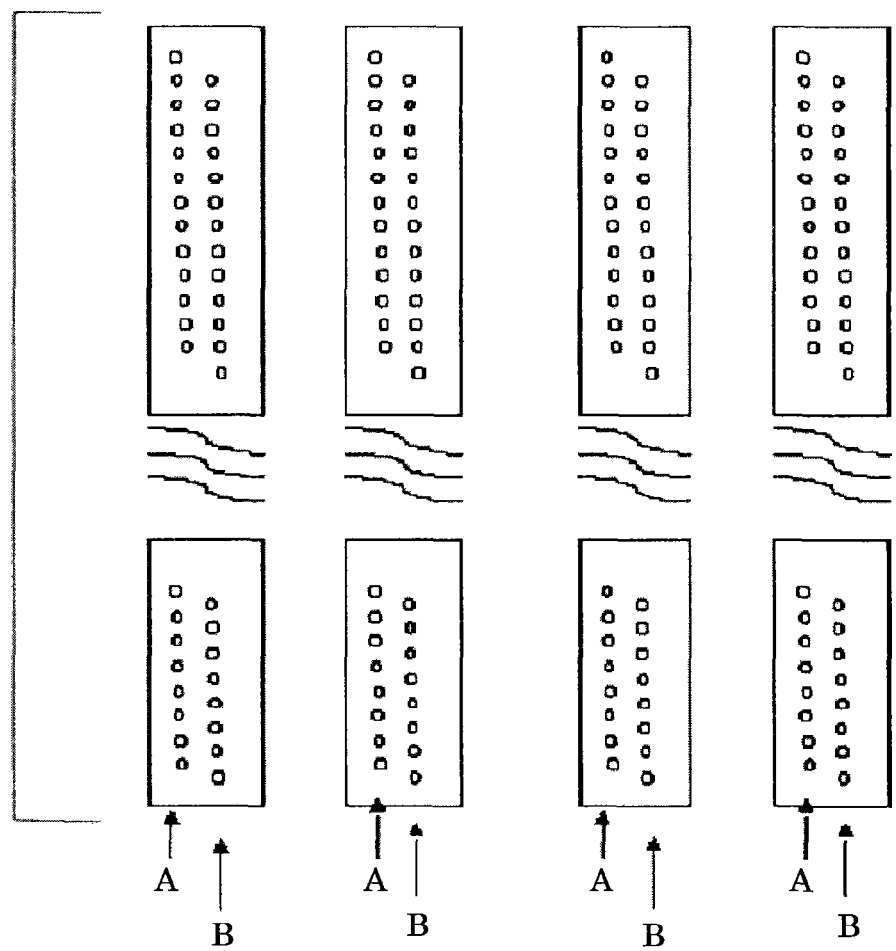
FIG. 2 is a schematic plan view of another example of a recording head as seen from a nozzle surface.

Here, FIG. 1 and FIG. 2 are schematic plan view of a recording head as viewed from a nozzle surface. FIG. 1 illustrates a two-head type composed of a first head (left) and a second head (right). FIG. 2 illustrates a four-head type composed of a first head, a second head, a third head and a fourth head which are arranged from left to right. In FIG. 1 and FIG. 2, "A" and "B" denote array A and array B, respectively.

In the two-head type, either the first head or the second head is covered with a sucking-and-covering unit (suction cap) in communication with a suction-generating unit, and the other is covered with a non-sucking-and-covering unit (moisturizing cap) not in communication with the suction-generating unit. In the example of FIG. 1, the first head is covered with the suction cap, and the second head is covered with the moisturizing cap.

In the four-head type, at least any one of the first head to the fourth head is covered with a sucking-and-covering unit (suction cap) in communication with a suction-generating unit, and the rest is(are) covered with a non-sucking-and-covering unit (moisturizing cap) not in communication with the suction-generating unit. In the example of FIG. 2, the first head is covered with the suction cap, and the second, the third and the fourth heads are covered with the moisturizing cap.

In the present invention, in any of the two-head type and the four-head type, any one nozzle array of the two arrays of the A array and the B array in at least one head discharges a pigment ink including carbon black, and the other array discharges a non-black color ink.

Here, in the two-head type of FIG. 1, for full-color recording, it is necessary to fill inks of yellow (Y), cyan (C), magenta (M) and black (Bk) respectively in 4 nozzle arrays.

Figure 3:
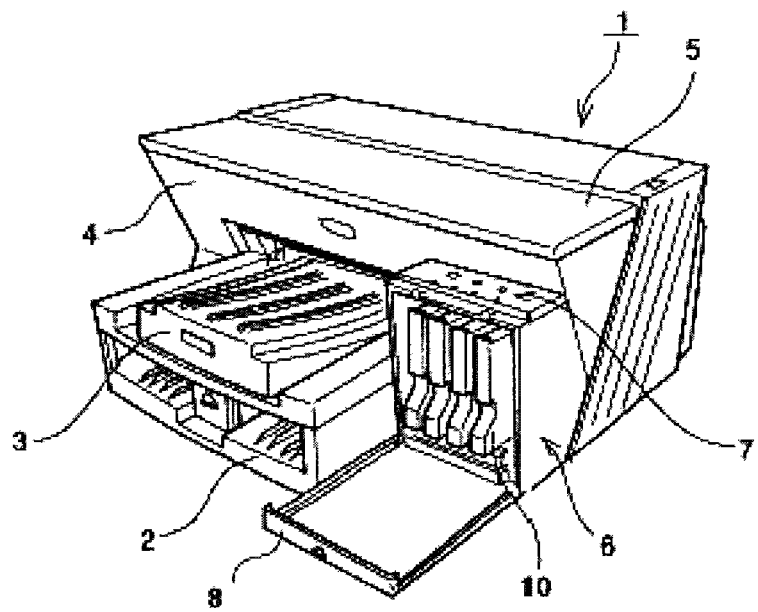
FIG. 3 is a perspective diagram illustrating one example of an inkjet recording apparatus of the present invention.

Here, one example of the inkjet recording apparatus of the present invention including the maintenance/recovery apparatus is explained in reference to FIG. 3. Here, FIG. 3 is a perspective diagram of the inkjet recording apparatus as viewed from a front side.

This inkjet recording apparatus is equipped with: an apparatus main body 1; a paper-feeding tray 2 for loading paper mounted on the apparatus main body 1; and a paper-discharging tray 3 for stocking the sheets mounted on the on apparatus main body 1 and having an image recorded (formed) thereon. Further, the apparatus main body 1 includes, at one side of a front surface 4, a cartridge-loading section 6 which protrudes forward from the front surface and is lower than a top surface 5, and on an upper surface of this cartridge-loading section 6, an operating portion 7 such as operation keys, indicators and so on are arranged. The cartridge-loading section 6 includes main tanks (hereinafter, it is referred to as "ink cartridges") 10 as tanks for storing liquids as liquid supplementation means are exchangeably mounted, and it also includes a front cover 8 which can be opened and closed.

Figure 4:
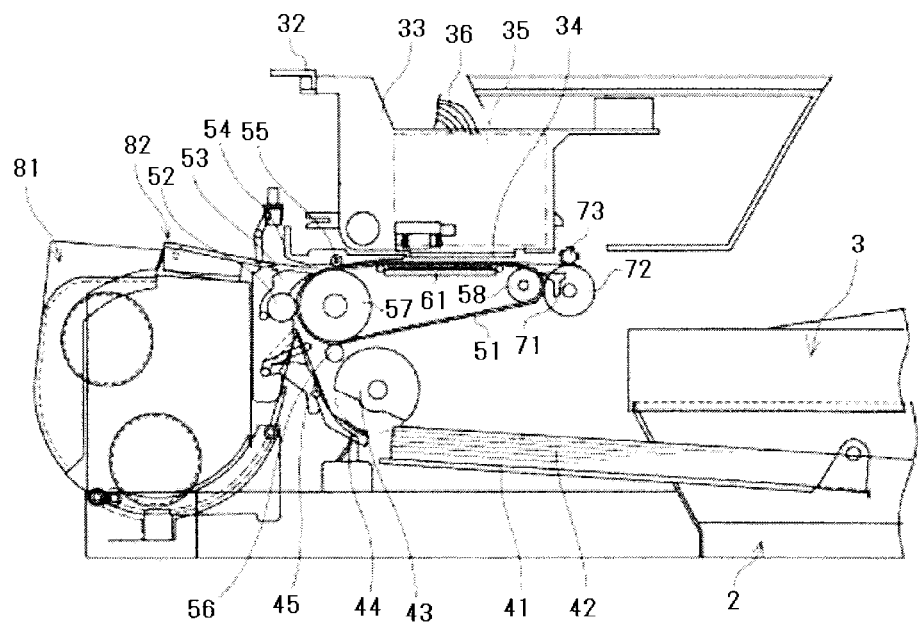
FIG. 4 is a schematic configuration diagram for explaining an overall configuration of a mechanical section of the inkjet recording apparatus of FIG. 3.
Figure 5:
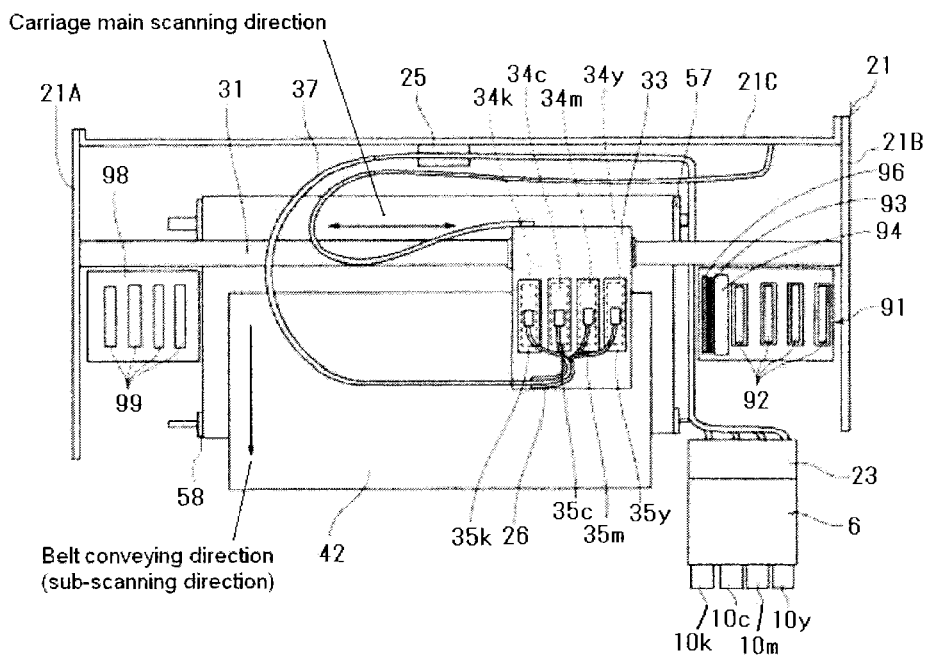
FIG. 5 is a schematic configuration diagram of the mechanical section of the inkjet recording apparatus of FIG. 3.

Next, a mechanical section of the inkjet recording apparatus of FIG. 3 is explained in reference to FIG. 4 and FIG. 5. Here, FIG. 4 is a schematic configuration diagram for explaining an overall configuration of the mechanical section, and FIG. 5 is a plan view explaining an essential portion of the mechanical section.

A carriage 33 is slidably held in a main scanning direction by a guide rod 31 and a stay 32 as guide members held between left and right side plates 21A, 21B which constitutes a frame 21, and it moves and scans by a main scanning motor not shown in a direction of an arrow in FIG. 5 (carriage scanning direction: main scanning direction).

A plurality of recording heads 34 composed of inkjet heads as liquid-droplet discharge heads for discharging liquid droplets of inks (ink droplets) is disposed in this carriage 33 in a direction that a plurality of nozzles intersects the main scanning direction and mounted with an ink-droplet discharge direction downward. Here, the recording heads 34 are composed of, for example: a recording head 34y to discharge yellow (Y) liquid droplets; a recording head 34m to discharge magenta (M) liquid droplets; a recording head 34c to discharge cyan (C) liquid droplets; a recording head 34k for discharge black (Bk) liquid droplets. Here, there is no distinction in terms of color when they are called as "recording heads 34". Here, the head configuration is not limited to these examples, and the head may be configured using one or more recording heads including one or more nozzle arrays which discharge liquid droplets of one or more colors.

As the liquid-droplet discharge head which constitutes the recording head 34, those equipped with a piezo actuator such as piezoelectric element and so on, a thermal actuator which makes use of a phase change by film boiling of a liquid using an electrothermal conversion element such as heating resistor and so on, a shape-memory-alloy actuator which makes use of changes in a metal phase due to temperature changes, an electrostatic actuator which makes use of an electrostatic force and so on as an energy generating unit for discharging liquid droplets may be used.

Also, subtanks 35y, 35m, 35c, 35k (these are simply called as "subtanks 35", where no distinction of the colors is necessary) are mounted on the carriage 33 for supplying inks of the respective colors to the respective recording heads 34. To these subtanks 35, the inks are supplied from ink cartridges 10 (these are called as "ink cartridges 10y, 10m, 10c, 10k" where the colors thereof are distinguished) described above via ink supply tubes 37 of the respective colors.

Here, the ink cartridges 10 are, as illustrated in FIG. 5, contained in a cartridge-loading section 6, and this cartridge-loading section 6 is equipped with a supply pump unit 23 for pumping an ink in the ink cartridge 10. Also, the ink supply tubes 37 are held fixed to a rear plate 21C which constitutes the frame 21 with a holder 25 on the main body side between the ink cartridge-loading section 6 and the subtanks 35. Further, they are also fixed on the carriage 33 with a fixing rib 26.

Meanwhile, as a paper-feeding section for feeding sheets 42 loaded on a paper-stacking unit (bottom plate) 41 of a paper-feeding tray 2, there is a separation pad 44 which separates and feeds the sheets 42 one-by-one from the paper-stacking unit 41 and which faces a paper-feeding roller 43 and is made of a material having a large friction coefficient, and this separation pad 44 is biased toward the paper-feeding roller 43.

Also, as a conveying section for conveying the sheet 42 fed from this paper-feeding section on a lower side of the recording heads 34, the apparatus is equipped with: a conveying belt 51 for conveying the sheets 42 by electrostatically adsorbing it a counter roller 52 for conveying the sheet 42 fed from the paper-feeding section via a guide 45 by sandwiching it with the conveying belt 51; a conveyance guide 53 for diverting by approximately 90° the sheet 42 sent in a substantially vertical and upward direction so as to follow the conveying belt 51; and a front-pressure roller 55 biased toward the conveying belt 51 by a pressing member 54. Also, the apparatus is equipped with a charging roller 56 as a charging unit for charging a surface of the conveying belt 51.

Here, the conveying belt 51 is an endless belt, stretched between a conveying roller 57 and a tension roller 58 so that it is configured to rotate in a belt conveying direction in FIG. 5. The charging roller 56 is arranged so as to contact a surface layer of the conveying belt 51 and to rotate by the rotation of the conveying belt 51 and puts 2.5N at each end of an axis thereof as a pressurizing force.

Also, a guide member 61 is arranged corresponding to a printing region by the recording heads 34 behind the conveying belt 51. A top surface of this guide member 61 protrudes a tangent line of the two (2) rollers (the conveying roller 57 and the tension roller 58) which support the conveying belt 51 toward a side of the recording heads 34. Thereby, the conveying belt 51 is lifted and guided at the top surface of the guide member 61 in the printing region, and accordingly, high-precision flatness is maintained.

Further, as a paper-discharging unit for discharging the sheets 42 with recording by the recording heads 34, the apparatus is equipped with: a separation claw 71 for separating the sheet 42 from the conveying belt 51; a paper-discharging roller 72 and a paper-discharging roller 73; and a paper-discharging tray 3 below the paper-discharging roller 72. Here, a height from the paper-discharging tray 3 to the position between the paper-discharging roller 72 and the paper-discharging roller 73 is relatively large in order to increase an amount of the sheets to be stocked on the paper-discharging tray 3.

Also, a two-side paper-feeding unit 81 is detachably attached to a rear part of the apparatus main body 1. This two-side paper-feeding unit 81 captures and inverts the sheet 42 returned by a rotation in a reverse direction of the conveying belt 51, and it feeds the sheet again between a counter roller 52 and the conveying belt 51. Also, a manual paper-feeding unit 82 is arranged on a top surface of this two-side paper-feeding unit 81.

Further, as illustrated in FIG. 5, a maintenance/recovery apparatus (hereinafter, it may also be referred to as "subsystem") 91 is arranged in a non-printing region on one side of the scanning direction of the carriage 33 for maintaining and recovering a nozzle condition of the recording heads 34.

This subsystem 91 is equipped with: cap members (hereinafter, they may also be referred to as "caps") 92 for capping respective nozzle surfaces of the recording heads 34; a wiper blade 93 as a blade member for wiping the nozzle surfaces; a blank discharge receiver 94 for receiving liquid droplets during blank discharge that the liquid droplets not contributing to recording are discharged for discharging a viscous ink, and a wiper cleaner (not shown) as a cleaning member integrally formed with this blank discharge receiver 94 for removing an ink adhered to the wiper blade 93; a cleaner roller 96 which constitutes a cleaner means for pressing the wiper blade 93 to a side of the wiper cleaner in cleaning the wiper blade 93; and so on.

Also, as illustrated in FIG. 5, a blank discharge receiver 98 is arranged in the non-printing region on the other side of the scanning direction of the carriage 33 for receiving liquid droplets during blank discharge that the liquid droplets not contributing to recording are discharged for discharging a viscous ink during recording, and this blank discharge receiver 98 is equipped with openings 99 along a nozzle array direction of the recording heads 34.

In the inkjet recording apparatus as configured above, the sheets 42 are separated and fed one-by-one from the paper-feeding tray 2. The sheet 42 fed in a substantially vertical and upward direction is guided by the guide 45 and conveyed by being sandwiched between the conveying belt 51 and the counter roller 52, and a tip thereof is further guided by the conveyance guide 53. It is pressed to the conveying belt 51 by the front-pressure roller 55, and a carrying direction thereof is diverted by approximately 90°.

At this time, by a positive power and a negative power are alternately and repeatedly applied, i.e. an alternating voltage is applied, on the charging roller 56 from a high-voltage power supply by a control circuit not shown, and the conveying belt 51 attains an alternating charged-voltage pattern; that is, it is alternately charged with the positive and negative forming stripes with a predetermined width in a sub-scanning direction as a rotating direction thereof. When the sheet 42 is fed on this charged conveying belt 51 with alternating positive and negative charges, the sheet 42 is electrostatically adsorbed on the conveying belt 51, and the sheet 42 is conveyed in the sub-scanning direction by a rotating movement of the conveying belt 51. When the recording heads 34 is driven in correspondence to an image signal while the carriage 33 is moved, the recording heads discharge ink droplets on the stopped sheet 42 to record one line. Then, the sheet 42 is conveyed by a predetermined distance, and the next line is recorded. When a recording end signal or a signal that a rear end of the sheet 42 reached a recording region is received, the recording operation is terminated, and the sheet 42 is discharged in the paper-discharging tray 3.

Also, while waiting for printing (recording), the carriage 33 is moved to a side of the subsystem 91, where the recording heads 34 are capped with the cap members 92 for keeping the nozzles wet, and thereby discharge failure due to ink drying is prevented. Also, a recovery operation is carried out that the viscous ink or air bubbles are discharged by sucking the inks from the nozzles with the cap members 92 capping the recording heads 34 ("nozzle suction" or "head suction"). Also, a blank discharge operation is carried out by discharging an ink unrelated to recording before recording or during recording. Thereby, stable discharge performance of the recording heads 34 is maintained.

Figure 6:
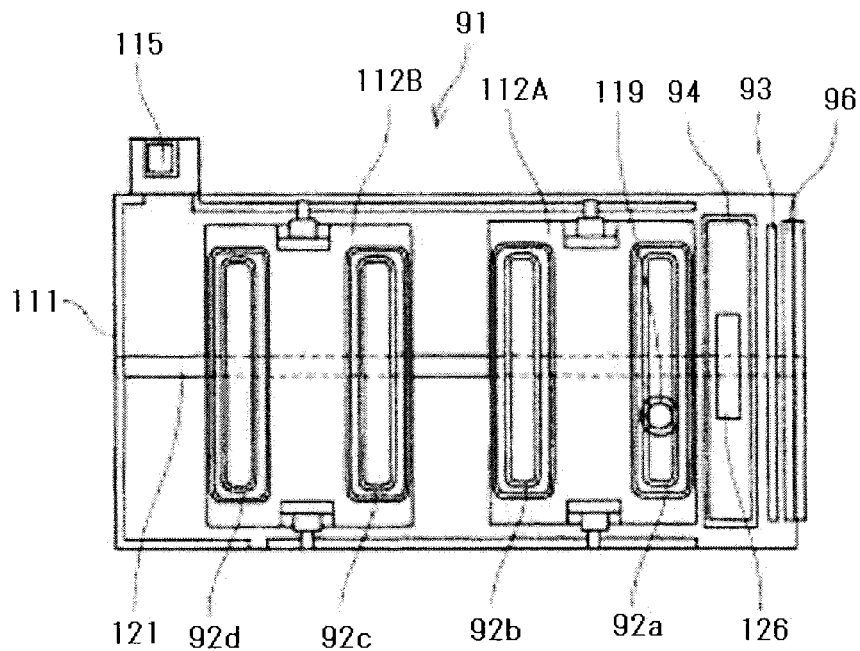
FIG. 6 is a schematic configuration diagram of a maintenance/recovery apparatus.
Figure 7:
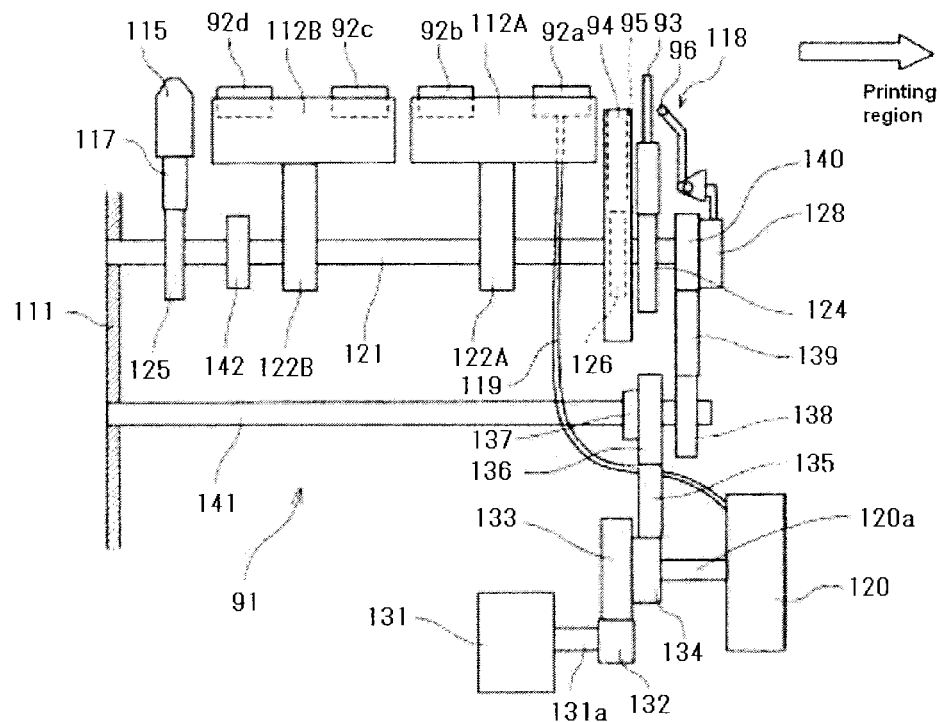
FIG. 7 is a rough schematic configuration diagram of FIG. 6.
Figure 8:
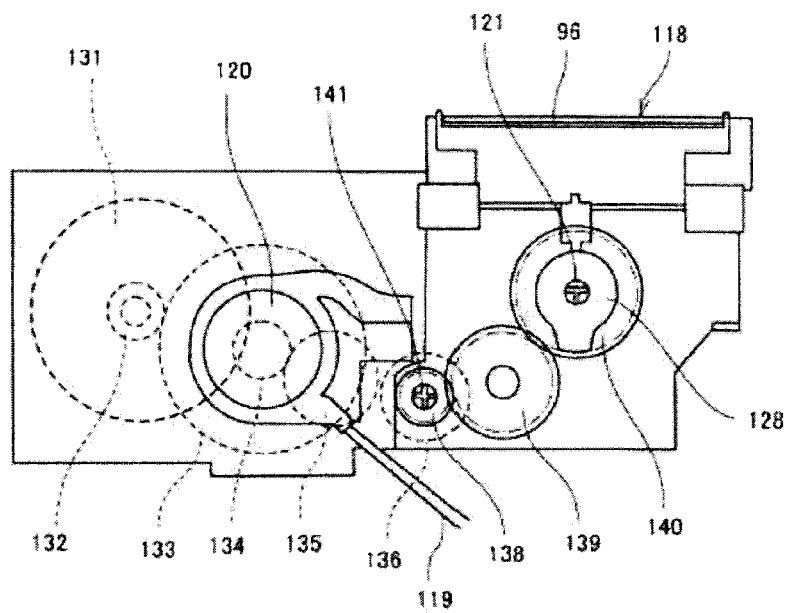
FIG. 8 is a right side view of FIG. 6.

Next, an overview of a configuration of the subsystem 91 including a maintenance/recovery apparatus in the inkjet recording apparatus of the present invention is explained in reference to FIG. 6 to FIG. 8. Here, FIG. 6 is a schematic configuration diagram of the system, FIG. 7 is a rough schematic configuration diagram of the system, and FIG. 8 is a right-side explanatory diagram of FIG. 6.

To a frame (frame of the maintenance apparatus) 111 of this subsystem 91, two (2) cap holders 112A and 112B as a cap-holding mechanism, a wiper blade 93 as a wiping member including an elastic body as a cleaning means, and a carriage lock 115 are arranged, where each may be raised and lowered (vertically movable). Also, a blank discharge receiver 94 is arranged between the wiper blade 93 and the cap holder 112A, and to clean the wiper blade 93, a wiper cleaner 118 as a cleaner means including a cleaner roller 96 as a cleaning member for pressing the wiper blade 93 from outside of the frame 111 to a side of a wiper cleaner 95 as a cleaning member of the blank discharge receiver 94 is pivotally held.

The cap holders 112A and 112B (they are indistinguishingly called as "cap holders 112") respectively hold two (2) caps 92a and 92b, and caps 92c and 92d (they are indistinguishingly called as "caps 92") for capping the nozzle surface of the two (2) recording heads 34.

Here, a tubing pump (suction pump) 120 as a suction means is connected via a flexible tube 119 to the cap 92a held by the cap holder 112A on a side closest to the printing region, and the tubing pump 120 is not connected to the other caps 92b, 92c, 92d. That is, only the cap 92a is regarded as a suction (recovery) and moisturizing cap (hereinafter, it may also be referred to as "suction cap"), and the other caps 92b, 92c, 92d are all regarded as moisturizing caps. Thus, when a recovery operation of the recording heads 34 is carried out, the recording heads 34 for the recovery operation are selectively moved to a location where it may be capped by the suction cap 92a.

Also, a camshaft 121 rotatably supported by the frame 111 is arranged below these cap holders 112A and 112B. This camshaft 121 is equipped with: cap cams 122A and 122B for raising and lowering the cap holders 112A, 112B; a wiper cam 124 for raising and lowering the wiper blade 93; a carriage lock cam 125 for raising and lowering the carriage lock 115 via a carriage lock arm 117; a roller 126 as a rotating body which is a blank discharge landing member on which liquid droplets of the blank discharge land in the blank discharge receiver 94; and a cleaner cam 128 for swinging the wiper cleaner 118.

Here, the caps 92 are raised and lowered by the cap cams 122A, 122B. The wiper blade 93 is raised and lowered by the wiper cam 124. The wiper cleaner 118 proceeds when the wiper blade 93 is being lowered, while it is sandwiched between the cleaner roller 96 of this wiper cleaner 118 and the wiper cleaner 95 of the blank discharge receiver 94, and an ink adhered to the wiper blade 93 is scraped into the blank discharge receiver 94.

The carriage lock 115 is biased upward (lock direction) by a compression spring not shown, and it is raised and lowered via a carriage lock arm 117 driven by the carriage lock cam 125.

Then, for rotationally driving the tubing pump 120 and the camshaft 121, the rotation of a motor 131 is transmitted to a motor gear 132 attached to a motor shaft 131a, and the motor gear 132 engages a pump gear 133 attached to a pump shaft 120a of the tubing pump 120. Further, an intermediate gear 134 formed with the pump gear 133 engages an intermediate gear 136 having a one-way clutch 137 via an intermediate gear 135, an intermediate gear 138 whose axle is the same as the axle of the intermediate gear 136 engages a cam gear 140 secured to the camshaft 121 via an intermediate gear 139. Here, an intermediate shaft 141 that is a rotational axle of the intermediate gear 136,138 having the clutch 137 is rotationally held by the frame 111.

Also, a cam for home position sensor 142 is arranged on the camshaft 121 for detecting a home position. When the caps 92 comes to the lowermost by a home position sensor (not shown) arranged in this subsystem 91, a home position lever (not shown) is operated, the sensor is in an open state, and a home position of the motor 131 (other than the pump 120) is detected. Here, when the power source is turned on, it moves up and down regardless of the position of the caps 92 (cap holders 112), and the position is not detected until it starts moving. After the home position (in the middle of elevation) of the caps 92 is detected, it moves to the lowermost end by moving a predetermined distance. Thereafter, the carriage moves from side to side and returns to a cap position after the position detection, and the recording heads 34 are capped.

Figure 9:
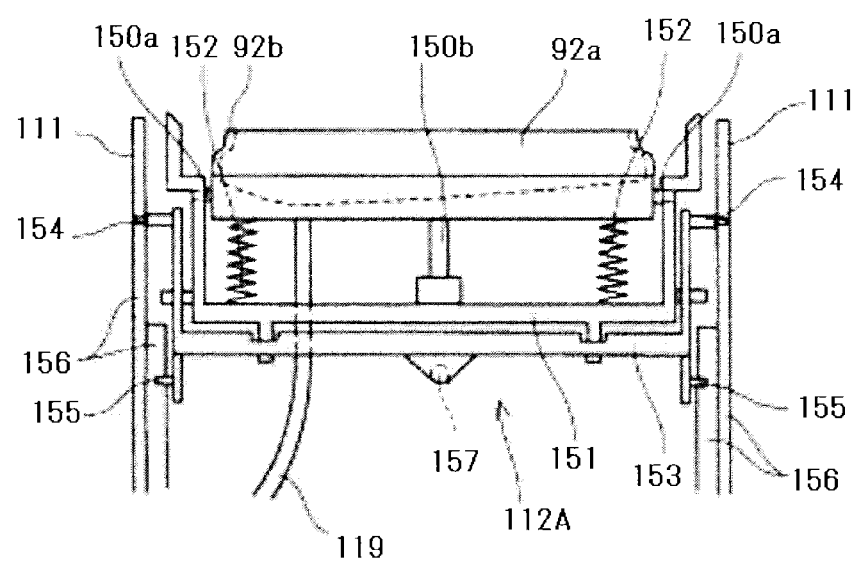
FIG. 9 is a side view of a cap holding-elevating mechanical section.

Next, a holding mechanism and an elevating mechanism (vertically moving mechanism) of the caps 92 are explained in detail in reference to FIG. 9. Here, FIG. 9 is a side view of the cap holding-elevating mechanical section.

A cap holder 112A as a cap holding mechanism includes: a holder 151 which holds a cap 92a and a cap 92b (these may also be referred to collectively as "caps 92A") in a vertically movable manner; springs 152 which bias upward the caps 92A interposed between the bottom of the caps 92A and the bottom surface of the holder 151; and a slider 153 which holds the holder 151 in a manner movable in a longitudinal direction (in a direction of an arrangement of the nozzles of the recording heads 34).

The caps 92A are mounted to the holder 151 in a vertically movable manner by inserting guide pins 150a on both ends thereof to guide grooves (not shown) of the holder 151 in a vertically movable manner and by inserting guide shafts 150b arranged at a bottom surface thereof to the holder 151 in a vertically movable manner. The springs 152 interposed between the caps 92A and the cap holder 151 bias upward the caps 92a, 92b (in a direction that they press toward the nozzle surface when they are capping).

Regarding the slider 153, by slidably fitting guide pins 154, 155 allocated at a front and back ends thereof into guide grooves 156 formed in the frame 111, the slider 153, the holder 151 and the caps 92A as a whole are configured to move vertically.

Then, a cam pin 157 disposed at a bottom surface of the slider 153 is fit to a cam groove (not shown) of a cap cam 122A, and by the rotation of the cap cam 122A which moves with the rotation of the camshaft 121 to transmit the rotation of the motor 131, the slider 153, the holder 151 and the cap 92A move vertically.

Further, a tube 119 is inserted through the slider 153 and the holder 151, routed downward of a central position of the cap with respect to a transverse direction of the cap 92a and connected to the suction cap 92a.

Here, a cap holder 112B which holds caps 92c, 92d (these may also be referred to collectively as "caps 92B") and a configuration for vertical movement thereof is similar to the above, and an explanation thereof is omitted. Here, a tube 119 is not connected to the caps 92c, 92d. In this way, the configuration is such that driving the motor 131 as one driving source rotates the camshaft 121 as one shaft and that the rotation of this camshaft 121 rotates the cams 122A, 122B fixed to the camshaft 121 and moves vertically the caps 92A and caps 92B.

EXAMPLES

Hereinafter, the present invention is further described in detail with reference to Examples, which however shall not be construed as limiting the scope of the present invention. "Part" represents "parts by mass" unless otherwise specified, and "%" represents "% by mass" unless otherwise specified.

Preparation Example 1

Preparation of Resin-Coated Carbon-Black Particle Dispersion

A 1-L flask equipped with a mechanical stirrer, a thermometer, a nitrogen-gas inlet tube, a reflux tube and a dropping funnel was sufficiently purged with a nitrogen gas and then was charged with 11.2 g of styrene, 2.8 g of acrylic acid, 12.0 g of laurylmethacrylate, 4.0 g of polyethylene glycol methacrylate (BLEMMER PE-90, manufactured by NOF Corporation), 4.0 g of styrene macromer (AS-6, manufactured by Toagosei Co., Ltd.), and 0.4 g of mercaptoethanol and heated to 65° C. Next, a mixed solution of 100.8 g of styrene, 25.2 g of acrylic acid, 108.0 g of laurylmethacrylate, 36.0 g of polyethylene glycol methacrylate (BLEMMER PE-90, manufactured by NOF Corporation), 60.0 g of hydroxyethylmethacrylate, 36.0 g of styrene macromer (AS-6, manufactured by Toagosei Co., Ltd.), 3.6 g of mercaptoethanol, 2.4 g of azobisdimethylvaleronitrile, and 18 g of methyl ethyl ketone was added dropwise into the flask over 2.5 hours. After completion of the dropwise addition, a mixed solvent of 0.8 g of azobisdimethylvaleronitrile and 18 g of methyl ethyl ketone was added dropwide into the flask over 0.5 hours. It was aged at 65° C. for 1 hour, followed by an addition of 0.8 g of azobisdimethylvaleronitrile, and further aged for 1 hour. After completion of a reaction, 364 g of methyl ethyl ketone was added in the flask, and 800 g of a polymer solution having a concentration of 50%. Next, a part of the polymer solution was dried and measured by gel permeation chromatography (standard: polystyrene; solvent: tetrahydrofuran), and a weight-average molecular weight thereof was 15,000.

Then, 28 g of the polymer solution thus obtained, 26 g of carbon black (NIPEX160, manufactured by Degussa), 13.6 g of a 1-mol/L potassium hydroxide solution, 20 g of methyl ethyl ketone, and 30 g of ion-exchanged water were sufficiently stirred. Thereafter, it was kneaded 20 times using a three-roll mill (NR-84A, manufactured by Noritake Co., Ltd.). An obtained paste was added with 200 g of ion-exchanged water and sufficiently stirred, and then methyl ethyl ketone and a part of water were distilled using an evaporator. Thereby, a resin-coated carbon-black particle dispersion having a pigment concentration of 13% was obtained.

Preparation Example 2

Preparation of Surfactant-Treated Carbon-Black Particle Dispersion

<<Composition>>

| | |
|---|---|
| Carbon black | 175 parts |
| (NIPEX160, manufactured by Degussa; BET specific surface area: 150 m$^2$/g, average primary particle diameter: 20 nm, pH 4.0; DBP oil absorption: 620 g/100 g) | |
| Formalin condensate of sodium naphthalenesulfonate | 175 parts |
| (PIONIN A-45-PN, manufactured by Takemoto Oil & Fat Co., Ltd.; total content of dimers, trimers and tetramers of naphthalenesulfonate = 50%) | |
| Distilled water | 650 parts |

A mixture of the above composition was pre-mixed, and a mixed slurry (a) was prepared. This was circulated and dispersed at a circumferential speed of 10 m/s and a liquid temperature of 10° C. for 3 minutes in a disc-type media mill (DMR, manufactured by Ashizawa Finetech Ltd.) with 0.05-mm zirconia beads with a packing rate of 55% by volume, coarse particles were centrifuged by a centrifuge (Model-7700, manufactured by Kubota Corporation), and a surfactant-treated carbon-black particle dispersion having a pigment concentration of 13% was obtained.

Preparation Example 3

Preparation of Resin-Coated Magenta-Pigment Particle Dispersion

A resin-coated magenta-pigment particle dispersion having a pigment concentration of 13% was obtained in the same manner as Preparation Example 1 except that the carbon black as a pigment in Preparation Example 1 was changed to C. I. Pigment Red 122 (CROMOPHTAL Jet Magenta DMQ, manufactured by BASF).

The obtained resin-coated magenta-pigment particle dispersion was measured using a particle size distribution measurement apparatus (MICROTRAC UPA, manufactured by Nikkiso Co., Ltd.), and an average particle diameter (D50%) thereof was 127 nm.

Preparation Example 4

Preparation of Surfactant-Treated Magenta-Pigment Particle Dispersion

<<Composition>>

| | |
|---|---|
| Pigment Red 122 | 24 parts |
| (TONER MAGENTA EO02, manufactured by Clariant(Japan) K.K.) | |
| A 10-% aqueous solution of a compound represented by the following structural formula | 120 parts |
| 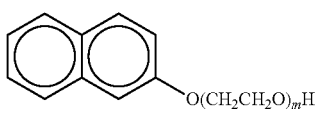 $O(CH_2CH_2O)_mH$ m = 40 | |
| Ion-exchanged water | 16 parts |

A mixture (A) of the above composition was placed in a 500-mL beaker and stirred for 3 hours with an addition of TEFLON (registered trademark)-coated stir bar. Next, the mixture (A) which has been processed with this mixing was subjected to a dispersion process for 8 hours in a sand mill (tabletop batch-type sand mill, manufactured by Kanpe Hapio Co., Ltd.) using zirconia balls having a diameter of 0.3 mm, and a surfactant-treated magenta-pigment particle dispersion having a pigment concentration of 13% was obtained.

The obtained surfactant-treated magenta-pigment particle dispersion was measured using a particle size distribution measurement apparatus (MICROTRAC UPA, manufactured by Nikkiso Co., Ltd.), and an average particle diameter (D50%) thereof was 97 nm.

Preparation Example 5

Preparation of Resin-Coated Cyan-Pigment Particle Dispersion

A resin-coated cyan-pigment particle dispersion having a pigment concentration of 13% was obtained in the same manner as Preparation Example 1 except that the carbon black as a pigment in Preparation Example 1 was changed to a copper phthalocyanine pigment (CHROMOFINE BLUE A-220JC, C. I. Pigment Blue 15:3, manufactured by Dainichiseika Color & Chemicals Mfg. Co., Ltd.).

The obtained resin-coated cyan-pigment particle dispersion was measured using a particle size distribution measurement apparatus (MICROTRAC UPA, manufactured by Nikkiso Co., Ltd.), and an average particle diameter (D50%) thereof was 93 nm.

Preparation Example 6

Preparation of Surfactant-Treated Cyan-Pigment Particle Dispersion

A surfactant-treated cyan-pigment particle dispersion having a pigment concentration of 13% was obtained in the same manner as Preparation Example 4 except that Pigment Red 122 (TONER MAGENTA E002, manufactured by Clariant (Japan) K.K.) in Preparation Example 4 was changed to Pigment Blue 15:3 (LIONOL BLUE FG-7351, manufactured by Toyo Ink Co., Ltd.).

The obtained surfactant-treated cyan-pigment particle dispersion was measured using a particle size distribution measurement apparatus (MICROTRAC UPA, manufactured by Nikkiso Co., Ltd.), and an average particle diameter (D50%) thereof was 97 nm.

Preparation Example 7

Preparation of Resin-Coated Yellow-Pigment Particle Dispersion

A resin-coated yellow-pigment particle dispersion having a pigment concentration of 13% was obtained in the same manner as Preparation Example 1 except that the carbon black as a pigment in Preparation Example 1 was changed to C. I. Pigment Yellow 74 (Fast Yellow 531, manufactured by Dainichiseika Color & Chemicals Mfg. Co., Ltd.).

The obtained resin-coated yellow-pigment particle dispersion was measured using a particle size distribution measurement apparatus (MICROTRAC UPA, manufactured by Nikkiso Co., Ltd.), and an average particle diameter (D50%) thereof was 76 nm.

Preparation Example 8

Preparation of Surfactant-Treated Yellow-Pigment Particle Dispersion

A surfactant-treated yellow-pigment particle dispersion having a pigment concentration of 13% was obtained in the same manner as Preparation Example 4 except that Pigment Red 122 (TONER MAGENTA E002, manufactured by Clariant (Japan) K.K.) in Preparation Example 4 was changed to Pigment Yellow 138 (LIONOGEN YELLOW 1010, manufactured by Toyo Ink Co., Ltd.).

The obtained surfactant-treated yellow-pigment particle dispersion was measured using a particle size distribution measurement apparatus (MICROTRAC UPA, Manufactured by Nikkiso Co., Ltd.), and an average particle diameter (D50%) was 70 nm.

<Preparation of Recording Ink>

Recording inks were manufactured by the following procedure. First, dispersions, water-soluble organic solvents (wetting agents), surfactants and water shown in Table 1-A to Table 3 below were mixed and stirred for 1 hour for uniform mixing. This dispersion liquid was subjected to pressure filtration in a polyvinylidene-fluoride membrane filter having an average pore diameter of 5.0 μm to remove coarse particles and dust, and the recording ink of Table 1-A to Table 3 below were prepared.

In the tables, "bal." denotes "balance".

TABLE 1-A

| | Component (% by mass) | Bk-1 | Bk-2 | Bk-3 | Bk-4 | Bk-5 | Bk-6 |
|---|---|---|---|---|---|---|---|
| Pigment dispersion | Resin-coated Bk particle dispersion (Preparation Example 1) | 49.2 | 36.9 | 46.2 | 55.4 | 67.7 | 49.2 |
| | Surfactant-treated Bk particle dispersion (Preparation Example 2) | 12.3 | 9.2 | 11.5 | 13.8 | 16.9 | 12.3 |
| | Self-dispersible pigment dispersion KM-9036*1 | — | — | — | — | — | — |
| Surfactant | ZONYL FS-300*2 | 0.5 | 0.5 | 0.5 | 0.5 | 0.5 | 0.5 |
| | KF-353*3 | 0.1 | 0.1 | 0.1 | 0.1 | 0.1 | — |
| Water-soluble organic solvent | 3-Methyl-1,3-butanediol | — | 5.0 | 26.0 | — | — | — |
| | 1,3-Butanediol | 15.0 | 5.0 | — | 28.0 | — | — |
| | Triethylene glycol | — | — | — | — | — | 30.0 |
| | Glycerin | 15.0 | 10.0 | — | — | 14.0 | — |
| | Pure water | bal. | bal. | bal. | bal. | bal. | bal. |
| | Total (% by mass) | 100.0 | 100.0 | 100.0 | 100.0 | 100.0 | 100.0 |

TABLE 1-B

| | Component (% by mass) | Bk-7 | Bk-8 | Bk-9 | Bk-10 | Bk-11 | Bk-12 |
|---|---|---|---|---|---|---|---|
| Pigment dispersion | Resin-coated Bk particle dispersion (Preparation Example 1) | 49.2 | 49.2 | 49.2 | 49.2 | 27.7 | 33.8 |
| | Surfactant-treated Bk particle dispersion (Preparation Example 2) | 12.3 | 12.3 | 12.3 | 12.3 | 33.8 | 27.7 |
| | Self-dispersible pigment dispersion KM-9036*1 | — | — | — | — | — | — |
| Surfactant | ZONYL FS-300*2 | — | 0.2 | 5.0 | 12.5 | 0.5 | 0.5 |
| | KF-353*3 | 0.1 | 0.1 | 0.1 | 0.1 | 0.1 | 0.1 |
| Water-soluble organic solvent | 3-Methyl-1,3-butanediol | 15.0 | 5.0 | — | — | 30.0 | — |
| | 1,3-Butanediol | — | 10.0 | — | — | — | 15.0 |
| | Triethylene glycol | 15.0 | 10.0 | — | 13.0 | — | — |
| | Glycerin | — | 5.0 | 30.0 | 13.0 | — | 15.0 |
| | Pure water | bal. | bal. | bal. | bal. | bal. | bal. |
| | Total (% by mass) | 100.0 | 100.0 | 100.0 | 100.0 | 100.0 | 100.0 |

TABLE 1-C

| | Component (% by mass) | Bk-13 | Bk-14 | Bk-15 | Bk-16 | Bk-17 | Bk-18 |
|---|---|---|---|---|---|---|---|
| Pigment dispersion | Resin-coated Bk particle dispersion (Preparation Example 1) | 55.4 | 56.6 | 24.6 | 76.9 | 6.2 | 61.5 |
| | Surfactant-treated Bk particle dispersion (Preparation Example 2) | 6.2 | 4.9 | 6.2 | 19.2 | 55.4 | — |
| | Self-dispersible pigment dispersion KM-9036*1 | — | — | — | — | — | — |
| Surfactant | ZONYL FS-300*2 | 0.5 | 0.5 | 0.5 | 0.5 | 0.5 | 0.5 |
| | KF-353*3 | 0.1 | 0.1 | 0.1 | 0.1 | 0.1 | 0.1 |
| Water-soluble organic solvent | 3-Methyl-1,3-butanediol | — | — | 8.0 | — | — | 30.0 |
| | 1,3-Butanediol | 15.0 | 15.0 | 8.0 | — | — | — |
| | Triethylene glycol | — | — | — | 3.0 | 30.0 | — |
| | Glycerin | 15.0 | 15.0 | — | — | — | — |
| | Pure water | bal. | bal. | bal. | bal. | bal. | bal. |
| | Total (% by mass) | 100.0 | 100.0 | 100.0 | 100.0 | 100.0 | 100.0 |

TABLE 1-D

| | Component (% by mass) | Bk-19 | Bk-20 | Bk-21 | Bk-22 | Bk-23 | Bk-24 |
|---|---|---|---|---|---|---|---|
| Pigment dispersion | Resin-coated Bk particle dispersion (Preparation Example 1) | — | — | 48.0 | 52.3 | 43.9 | 54.3 |
| | Surfactant-treated Bk particle dispersion (Preparation Example 2) | 61.5 | — | 12.0 | 13.1 | 17.6 | 7.3 |
| | Self-dispersible pigment dispersion KM-9036*1 | — | 62.0 | — | — | — | — |
| Surfactant | ZONYL FS-300*2 | 0.5 | 0.5 | 0.5 | 0.5 | 0.5 | 0.5 |
| | KF-353*3 | 0.1 | 0.1 | 0.1 | 0.1 | 0.1 | 0.1 |
| Water-soluble organic solvent | 3-Methyl-1,3-butanediol | — | — | — | — | — | — |
| | 1,3-Butanediol | 15.0 | 15.0 | 15.0 | 15.0 | 15.0 | 15.0 |
| | Triethylene glycol | — | — | — | — | — | — |
| | Glycerin | 15.0 | 15.0 | 15.0 | 15.0 | 15.0 | 15.0 |
| | Pure water | bal. | bal. | bal. | bal. | bal. | bal. |
| | Total (% by mass) | 100.0 | 100.0 | 100.0 | 100.0 | 100.0 | 100.0 |

TABLE 2-A

| | Component (% by mass) | Ma-1 | Ma-2 | Ma-3 | Ma-4 | Ma-5 | Ma-6 |
|---|---|---|---|---|---|---|---|
| Pigment dispersion | Resin-coated Ma-pigment particle dispersion (Preparation Example 3) | 5.4 | 2.3 | 3.8 | 6.2 | 7.7 | 5.4 |
| | Surfactant-treated Ma-pigment particle dispersion (Preparation Example 4) | 48.5 | 20.8 | 34.6 | 55.4 | 69.2 | 48.5 |
| Surfactant | ZONYL FS-300*2 | 0.5 | 0.5 | 0.5 | 0.5 | 0.5 | 0.5 |
| | KF-353*3 | 0.1 | 0.1 | 0.1 | 0.1 | 0.1 | — |
| Water-soluble organic solvent | 3-Methyl-1,3-butanediol | — | 10.0 | — | 14.0 | — | 15.0 |
| | 1,3-Butanediol | 30.0 | — | 13.0 | — | 5.0 | — |
| | Triethylene glycol | — | — | — | 14.0 | — | 15.0 |
| | Glycerin | — | 10.0 | 13.0 | — | 15.0 | — |
| | Pure water | bal. | bal. | bal. | bal. | bal. | bal. |
| | Total (% by mass) | 100.0 | 100.0 | 100.0 | 100.0 | 100.0 | 100.0 |

TABLE 2-B

| | Component (% by mass) | Ma-7 | Ma-8 | Ma-9 | Ma-10 | Ma-11 |
|---|---|---|---|---|---|---|
| Pigment dispersion | Resin-coated Ma-pigment particle dispersion (Preparation Example 3) | 5.4 | 5.4 | 5.4 | 5.4 | 0.5 |
| | Surfactant-treated Ma-pigment particle dispersion (Preparation Example 4) | 48.5 | 48.5 | 48.5 | 48.5 | 53.3 |
| Surfactant | ZONYL FS-300*2 | — | 0.2 | 5.0 | 12.5 | 0.5 |
| | KF-353*3 | 0.1 | 0.1 | 0.1 | 0.1 | 0.1 |
| Water-soluble organic solvent | 3-Methyl-1,3-butanediol | 30.0 | — | — | — | — |
| | 1,3-Butanediol | — | — | 15.0 | 15.0 | 15.0 |
| | Triethylene glycol | — | 30.0 | — | — | — |
| | Glycerin | — | — | 15.0 | 15.0 | 15.0 |
| | Pure water | bal. | bal. | bal. | bal. | bal. |
| | Total (% by mass) | 100.0 | 100.0 | 100.0 | 100.0 | 100.0 |

TABLE 2-C

| | Component (% by mass) | Ma-12 | Ma-13 | Ma-14 | Ma-15 | Ma-16 |
|---|---|---|---|---|---|---|
| Pigment dispersion | Resin-coated Ma-pigment particle dispersion (Preparation Example 3) | 4.8 | 24.2 | 32.3 | 1.5 | 9.6 |
| | Surfactant-treated Ma-pigment particle dispersion (Preparation Example 4) | 52.2 | 29.6 | 21.5 | 13.8 | 86.5 |
| Surfactant | ZONYL FS-300*2 | 0.5 | 0.5 | 0.5 | 0.5 | 0.5 |
| | KF-353*3 | 0.1 | 0.1 | 0.1 | 0.1 | 0.1 |
| Water-soluble organic solvent | 3-Methyl-1,3-butanediol | 15.0 | — | — | 10.0 | — |
| | 1,3-Butanediol | — | — | — | — | — |
| | Triethylene glycol | 15.0 | — | 30.0 | — | — |

TABLE 2-C-continued

| Component (% by mass) | Ma-12 | Ma-13 | Ma-14 | Ma-15 | Ma-16 |
|---|---|---|---|---|---|
| Glycerin | — | 30.0 | — | — | 2.0 |
| Pure water | bal. | bal. | bal. | bal. | bal. |
| Total (% by mass) | 100.0 | 100.0 | 100.0 | 100.0 | 100.0 |

TABLE 2-D

| | Component (% by mass) | Ma-17 | Ma-18 | Ma-19 | Ma-20 | Ma-21 |
|---|---|---|---|---|---|---|
| Pigment dispersion | Resin-coated Ma-pigment particle dispersion (Preparation Example 3) | 43.1 | 53.8 | — | 3.0 | 16.7 |
| | Surfactant-treated Ma-pigment particle dispersion (Preparation Example 4) | 10.8 | — | 53.8 | 50.8 | 37.1 |
| Surfactant | ZONYL FS-300*2 | 0.5 | 0.5 | 0.5 | 0.5 | 0.5 |
| | KF-353*3 | 0.1 | 0.1 | 0.1 | 0.1 | 0.1 |
| Water-soluble organic solvent | 3-Methyl-1,3-butanediol | — | — | — | — | — |
| | 1,3-Butanediol | 15.0 | 15.0 | 30.0 | 30.0 | 30.0 |
| | Triethylene glycol | — | 5.0 | — | — | — |
| | Glycerin | 15.0 | 10.0 | — | — | — |
| | Pure water | bal. | bal. | bal. | bal. | bal. |
| | Total (% by mass) | 100.0 | 100.0 | 100.0 | 100.0 | 100.0 |

TABLE 3

| | Component (% by mass) | Cy-1 | Ye-1 |
|---|---|---|---|
| Pigment dispersion | Resin-coated Cy-pigment particle dispersion (Preparation Example 5) | 3.8 | — |
| | Surfactant-treated Cy-pigment particle dispersion (Preparation Example 6) | 34.6 | — |
| | Resin-coated Ye-pigment particle dispersion (Preparation Example 7) | — | 3.8 |
| | Surfactant-treated Ye-pigment particle dispersion (Preparation Example 8) | — | 34.6 |
| Surfactant | ZONYL FS-300*2 | 0.5 | 0.5 |
| | KF-353*3 | 0.1 | 0.1 |
| Water-soluble organic solvent | 3-Methyl-1,3-butanediol | 5.0 | — |
| | 1,3-Butanediol | 10.0 | 15.0 |
| | Triethylene glycol | — | — |
| | Glycerin | 15.0 | 15.0 |
| | Pure water | bal. | bal. |
| | Total (% by mass) | 100.0 | 100.0 |

The pigment dispersions and the surfactants in Table 1-A to Table 3 are as follows.

1 Carbon black pigment dispersion having a pigment concentration of 13%, manufactured by Toyo Ink Co., Ltd.

2 Polyoxyethylene perfluoroalkyl ether, having a solid content of 40%, manufactured by DuPont Co.

3 Polyether-modified silicone compound, having a solid content of 100%, manufactured by Shin-Etsu Chemical Co., Ltd.

Table 4-A below shows the carbon black concentrations of the black inks as well as R(Bk), S(Bk) and (Bk)/S(Bk).

Table 4-B below shows the pigment concentrations of the color inks as well as R(CL), S(CL) and R(CL)/S(CL).

TABLE 4-A

| Ink type | Pigment concentration [% by mass] | R(Bk) [% by mass] | S(Bk) [% by mass] | R(Bk)/S(Bk) |
|---|---|---|---|---|
| Bk-1 | 8.0 | 80.0 | 20.0 | 4.00 |
| Bk-2 | 6.0 | 80.0 | 20.0 | 4.00 |
| Bk-3 | 7.5 | 80.0 | 20.0 | 4.00 |
| Bk-4 | 9.0 | 80.0 | 20.0 | 4.00 |
| Bk-5 | 11.0 | 80.0 | 20.0 | 4.00 |
| Bk-6 | 8.0 | 80.0 | 20.0 | 4.00 |
| Bk-7 | 8.0 | 80.0 | 20.0 | 4.00 |
| Bk-8 | 8.0 | 80.0 | 20.0 | 4.00 |
| Bk-9 | 8.0 | 80.0 | 20.0 | 4.00 |
| Bk-10 | 8.0 | 80.0 | 20.0 | 4.00 |
| Bk-11 | 8.0 | 45.0 | 55.0 | 0.82 |
| Bk-12 | 8.0 | 55.0 | 45.0 | 1.22 |
| Bk-13 | 8.0 | 90.0 | 10.0 | 9.00 |
| Bk-14 | 8.0 | 92.0 | 8.0 | 11.50 |
| Bk-15 | 4.0 | 80.0 | 20.0 | 4.00 |
| Bk-16 | 12.5 | 80.0 | 20.0 | 4.00 |
| Bk-17 | 8.0 | 10.0 | 90.0 | 0.11 |
| Bk-18 | 8.0 | 100.0 | 0.0 | — |
| Bk-19 | 8.0 | 0.0 | 100.0 | 0.00 |
| Bk-20 | 8.0 | — | — | — |
| Bk-21 | 7.8 | 80.0 | 20.0 | 4.00 |
| Bk-22 | 8.5 | 80.0 | 20.0 | 4.00 |
| Bk-23 | 8.0 | 71.4 | 28.6 | 2.50 |
| Bk-24 | 8.0 | 88.2 | 11.8 | 7.47 |

TABLE 4-B

| Ink type | Pigment concentration [% by mass] | R(CL) [% by mass] | S(CL) [% by mass] | R(CL)/S(CL) |
|---|---|---|---|---|
| Ma-1 | 7.0 | 10.0 | 90.0 | 0.11 |
| Ma-2 | 4.0 | 10.0 | 90.0 | 0.11 |
| Ma-3 | 5.0 | 10.0 | 90.0 | 0.11 |
| Ma-4 | 8.0 | 10.0 | 90.0 | 0.11 |
| Ma-5 | 10.0 | 10.0 | 90.0 | 0.11 |
| Ma-6 | 7.0 | 10.0 | 90.0 | 0.11 |
| Ma-7 | 7.0 | 10.0 | 90.0 | 0.11 |
| Ma-8 | 7.0 | 10.0 | 90.0 | 0.11 |

TABLE 4-B-continued

| Ink type | Pigment concentration [% by mass] | R(CL) [% by mass] | S(CL) [% by mass] | R(CL)/ S(CL) |
|---|---|---|---|---|
| Ma-9 | 7.0 | 10.0 | 90.0 | 0.11 |
| Ma-10 | 7.0 | 10.0 | 90.0 | 0.11 |
| Ma-11 | 7.0 | 1.0 | 99.0 | 0.01 |
| Ma-12 | 7.0 | 3.0 | 97.0 | 0.03 |
| Ma-13 | 7.0 | 45.0 | 55.0 | 0.82 |
| Ma-14 | 7.0 | 60.0 | 40.0 | 1.50 |
| Ma-15 | 2.0 | 10.0 | 90.0 | 0.11 |
| Ma-16 | 12.5 | 10.0 | 90.0 | 0.11 |
| Ma-17 | 7.0 | 80.0 | 20.0 | 4.00 |
| Ma-18 | 7.0 | 100.0 | 0.0 | — |
| Ma-19 | 7.0 | 0.0 | 100.0 | 0.00 |
| Ma-20 | 7.0 | 5.7 | 94.3 | 0.06 |
| Ma-21 | 7.0 | 31.0 | 69.0 | 0.45 |
| Cy-1 | 5.0 | 10.0 | 90.0 | 0.11 |
| Ye-1 | 5.0 | 10.0 | 90.0 | 0.11 |

<Print Evaluation of Ink Sets>

A print evaluation was carried out for the ink sets of Examples 1 to 20 and Comparative Examples 1 to 10 shown in Table 5-1 and Table 5-2 below.

It was carried out using an inkjet printer (IPSIO GX3000, manufactured by Ricoh Company, Ltd.) by varying a driving voltage of a piezoelectric element so that an equal amount of an ink was discharged and an equal amount of an ink was adhered on a recording medium.

The inkjet printer used for the evaluation was a printer of a two-head type, including 2 arrays of nozzles (nozzle array A and nozzle array B) per 1 head, and a suction cap was shared in each head. Thus, in this evaluation, inks in a set of two colors which were subjected to evaluation were filled in an identical head.

Here, a viscometer RE80L, manufactured by Toki Sangyo Co., Ltd., was used for measuring a viscosity of an ink, and a viscosity at 25° C. was measured. Results are shown in Table 5-1 and Table 5-2.

Also, P(Bk), [R(Bk)/S(Bk)], P(CL), [R(CL)/S(CL)], and [R(Bk)/S(Bk)]-[R(CL)/S(CL)] are shown in Table 5-1 and Table 5-2.

TABLE 5-1

| | | Ink type | Nozzle array A | | |
|---|---|---|---|---|---|
| | | | Viscosity [mPa·s] | P(Bk) [% by mass] | [R(Bk)/S(Bk)] |
| Example | 1 | Bk-1 | 8.0 | 8.0 | 4.00 |
| | 2 | Bk-2 | 4.2 | 6.0 | 4.00 |
| | 3 | Bk-3 | 6.4 | 7.5 | 4.00 |
| | 4 | Bk-4 | 11.0 | 9.0 | 4.00 |
| | 5 | Bk-5 | 13.0 | 11.0 | 4.00 |
| | 6 | Bk-6 | 8.0 | 8.0 | 4.00 |
| | 7 | Bk-7 | 8.0 | 8.0 | 4.00 |
| | 8 | Bk-8 | 8.0 | 8.0 | 4.00 |
| | 9 | Bk-9 | 8.0 | 8.0 | 4.00 |
| | 10 | Bk-10 | 8.0 | 8.0 | 4.00 |
| | 11 | Bk-11 | 8.0 | 8.0 | 0.82 |
| | 12 | Bk-12 | 8.0 | 8.0 | 1.22 |
| | 13 | Bk-13 | 8.0 | 8.0 | 9.00 |
| | 14 | Bk-14 | 8.0 | 8.0 | 11.50 |
| | 15 | Bk-1 | 8.0 | 8.0 | 4.00 |
| | 16 | Bk-1 | 8.0 | 8.0 | 4.00 |
| | 17 | Bk-21 | 7.6 | 7.8 | 4.00 |
| | 18 | Bk-22 | 8.4 | 8.5 | 4.00 |
| | 19 | Bk-23 | 8.0 | 8.0 | 2.50 |
| | 20 | Bk-24 | 8.0 | 8.0 | 7.47 |
| Comparative Example | 1 | Bk-15 | 3.1 | 4.0 | 4.00 |
| | 2 | Bk-16 | 16.0 | 12.5 | 4.00 |
| | 3 | Bk-17 | 8.0 | 8.0 | 0.11 |
| | 4 | Bk-18 | 8.0 | 8.0 | — |
| | 5 | Bk-19 | 8.0 | 8.0 | 0.00 |
| | 6 | Bk-20 | 8.0 | 8.0 | — |
| | 7 | Bk-15 | 3.1 | 4.0 | 4.00 |
| | 8 | Bk-16 | 16.0 | 12.5 | 4.00 |
| | 9 | Bk-1 | 8.0 | 8.0 | 4.00 |
| | 10 | Bk-1 | 8.0 | 8.0 | 4.00 |

TABLE 5-2

| | | Ink type | Nozzle array B | | |
|---|---|---|---|---|---|
| | | | Viscosity [mPa·s] | P(CL) [% by mass] | [R(CL)/S(CL)] | [R(Bk)/S(Bk)]-[R(CL)/S(CL)] |
| Example | 1 | Ma-1 | 8.0 | 7.0 | 0.11 | 3.89 |
| | 2 | Ma-2 | 4.1 | 4.0 | 0.11 | 3.89 |
| | 3 | Ma-3 | 6.0 | 5.0 | 0.11 | 3.89 |
| | 4 | Ma-4 | 10.5 | 8.0 | 0.11 | 3.89 |
| | 5 | Ma-5 | 14.2 | 10.0 | 0.11 | 3.89 |
| | 6 | Ma-6 | 8.0 | 7.0 | 0.11 | 3.89 |
| | 7 | Ma-7 | 8.0 | 7.0 | 0.11 | 3.89 |
| | 8 | Ma-8 | 8.0 | 7.0 | 0.11 | 3.89 |
| | 9 | Ma-9 | 8.0 | 7.0 | 0.11 | 3.89 |
| | 10 | Ma-10 | 8.0 | 7.0 | 0.11 | 3.89 |
| | 11 | Ma-11 | 8.0 | 7.0 | 0.01 | 0.81 |
| | 12 | Ma-12 | 8.0 | 7.0 | 0.03 | 1.19 |
| | 13 | Ma-13 | 8.0 | 7.0 | 0.82 | 8.18 |
| | 14 | Ma-14 | 8.0 | 7.0 | 1.50 | 10.00 |
| | 15 | Cy-1 | 8.0 | 5.0 | 0.11 | 3.89 |
| | 16 | Ye-1 | 8.0 | 5.0 | 0.11 | 3.89 |
| | 17 | Ma-3 | 6.0 | 5.0 | 0.11 | 3.89 |
| | 18 | Ma-4 | 10.5 | 8.0 | 0.11 | 3.89 |
| | 19 | Ma-20 | 8.0 | 7.0 | 0.06 | 2.44 |
| | 20 | Ma-21 | 8.0 | 7.0 | 0.45 | 7.02 |
| Comparative Example | 1 | Ma-15 | 2.2 | 2.0 | 0.11 | 3.89 |
| | 2 | Ma-16 | 18.0 | 12.5 | 0.11 | 3.89 |
| | 3 | Ma-17 | 8.0 | 7.0 | 4.00 | −3.89 |

TABLE 5-2-continued

|  | Ink type | Nozzle array B | | | |
|---|---|---|---|---|---|
|  |  | Viscosity [mPa·s] | P(CL) [% by mass] | [R(CL)/S(CL)] | [R(Bk)/S(Bk)]−[R(CL)/S(CL)] |
| 4 | Ma-18 | 8.0 | 7.0 | — | — |
| 5 | Ma-19 | 8.0 | 7.0 | 0.00 | 0.00 |
| 6 | Ma-1 | 8.0 | 7.0 | 0.11 | — |
| 7 | Ma-1 | 8.0 | 7.0 | 0.11 | 3.89 |
| 8 | Ma-1 | 8.0 | 7.0 | 0.11 | 3.89 |
| 9 | Ma-15 | 8.0 | 2.0 | 0.11 | 3.89 |
| 10 | Ma-16 | 8.0 | 12.5 | 0.11 | 3.89 |

Evaluations of "image density" and "discharge stability" were carried out in an environment adjusted to an MM environment (25±0.5° C., 50±5% RH).

Here, evaluation of only "discharge recovery" was carried out in an environment adjusted to an HL environment (32±0.5° C., 15±5% RH).

The evaluation items and evaluation methods therefor are described below.

<<Image Density>>

A chart including a 64-point solid-black-square character of black and the respective colors, which was created using Microsoft Word 2003, was printed on high-quality paper MYPAPER having a basis weight of 69.6 g/m², a sizing degree of 23.2 seconds and an air permeability of 21.0 seconds (manufactured by Ricoh Company, Ltd.). Then, the solid-black-square portion was subjected to calorimetry using X-Rite 938 (manufactured by X-Rite, Inc.), and an image density was evaluated. At that time, "plain paper—fast" mode was selected for a print mode with a driver included in the printer. Here, the image density of each color was determined based on the following evaluation criteria.

[Evaluation Criteria]

A: OD value Black: 1.20 or greater
  Yellow: 0.75 or greater
  Magenta: 0.90 or greater
  Cyan: 1.00 or greater
B: OD value Black: 1.10 or greater and less than 1.20
  Yellow: 0.70 or greater and less than 0.75
  Magenta: 0.80 or greater and less than 0.90
  Cyan: 0.90 or greater and less than 1.00
C: OD value Black: 1.00 or greater and less than 1.10
  Yellow: 0.65 or greater and less than 0.70
  Magenta: 0.70 or greater and less than 0.80
  Cyan: 0.80 or greater and less than 0.90
D: OD value Black: less than 1.00
  Yellow: less than 0.65
  Magenta: less than 0.70
  Cyan: less than 0.80

<<Discharge Recovery>>

Each of the inks of Examples 1 to 20 and Comparative Examples 1 to 10 shown in Table 5-1 and Table 5-2 was filled in the inkjet printer and allowed to stand in an HL environment (32±0.5° C., 15±5% RH) for 3 hours. Then, a nozzle check pattern with all the colors was printed, and it was confirmed that there was no discharge failure such as dead pixels and deflection. Thereafter, it was further allowed to stand for 6 days as it was. After the end of the standing, one sheet of a nozzle check pattern including a solid printing portion was printed on high-quality paper MYPAPER having a basis weight of 69.6 g/m², a sizing degree of 23.2 seconds and an air permeability of 21.0 seconds (manufactured by Ricoh Company, Ltd.), and it was confirmed whether or not there were dead pixels or deflection. If dead pixels or deflection of the ink were observed on the nozzle check pattern, a cleaning of the printer nozzles is carried out as a return operation to normal printing, and the total number thereof was evaluated. From the obtained total number, discharge recovery of each ink was evaluated based on the following evaluation criteria.

[Evaluation Criteria]

A: The number of cleanings was 0 to 1.

B: The number of cleanings was 2 or greater and less than 5.

D: The number of cleanings was 5 or greater.

<<Discharge Stability>>

Each of the inks of Examples 1 to 20 and Comparative Examples 1 to 10 shown in Table 5-1 and Table 5-2 was filled in the inkjet printer, and a chart including black, cyan, magenta, yellow solid and line patterns with identical area and shape was printed continuously on 100 sheets of high-quality paper MYPAPER having a basis weight of 69.6 g/m², a sizing degree of 23.2 seconds and an air permeability of 21.0 seconds (manufactured by Ricoh Company, Ltd.). During printing, if dead pixels or deflection of the ink were observed in the chart, a cleaning of the printer nozzles is carried out as a return operation to normal printing, and the total number thereof was evaluated. From the obtained total number, discharge stability of each ink set was evaluated based on the following evaluation criteria.

[Evaluation Criteria]

A: The number of cleanings was 0 to 1.

B: The number of cleanings was 2 or greater and less than 5.

D: The number of cleanings was 5 or greater.

<<Overall Evaluation>>

Each ink set was subjected to an overall evaluation at 5 levels based on the following criteria. The results are shown in Table 6.

[Evaluation Criteria]

5: Image density, discharge recovery and discharge stability were all "A".

4: Image density, discharge recovery and discharge stability were all "B" or greater, and both discharge recovery and discharge stability were "A".

3: Image density, discharge recovery and discharge stability were all "B" or greater, and either discharge recovery or discharge stability was "A".

2: Image density, discharge recovery and discharge stability were all "B" or greater, and both discharge recovery and discharge stability were "B".

1: Any of image density, discharge recovery and discharge stability was "C" or "D".

TABLE 6

| | Image density (Bk) | Image density (CL) | Discharge recovery | Discharge stability | Overall evaluation |
|---|---|---|---|---|---|
| Example 1 | A | A | A | A | 5 |
| Example 2 | B | B | A | B | 3 |
| Example 3 | B | A | A | A | 4 |
| Example 4 | A | A | B | A | 3 |
| Example 5 | A | A | B | B | 2 |
| Example 6 | B | B | B | B | 2 |
| Example 7 | B | B | B | B | 2 |
| Example 8 | B | B | B | A | 3 |
| Example 9 | B | B | B | A | 3 |
| Example 10 | B | B | B | B | 2 |
| Example 11 | B | B | B | B | 2 |
| Example 12 | B | B | A | B | 3 |
| Example 13 | A | A | A | B | 3 |
| Example 14 | A | A | B | B | 2 |
| Example 15 | A | A | A | A | 5 |
| Example 16 | A | A | A | A | 5 |
| Example 17 | A | A | A | A | 5 |
| Example 18 | A | A | A | A | 5 |
| Example 19 | A | A | A | A | 5 |
| Example 20 | A | A | A | A | 5 |
| Comparative Example 1 | D | D | D | D | 1 |
| Comparative Example 2 | A | A | D | D | 1 |
| Comparative Example 3 | C | A | D | B | 1 |
| Comparative Example 4 | B | A | D | B | 1 |
| Comparative Example 5 | C | C | D | B | 1 |
| Comparative Example 6 | B | B | D | B | 1 |
| Comparative Example 7 | D | A | B | B | 1 |
| Comparative Example 8 | A | A | D | D | 1 |
| Comparative Example 9 | A | D | B | B | 1 |
| Comparative Example 10 | A | A | D | D | 1 |

Aspects of the present invention are the following, for example.

<1> An ink set, including:
a black ink; and
a color ink,
wherein the ink set is used in an inkjet recording apparatus, including: a recording head which includes a plurality of nozzle arrays, each including a plurality of nozzles; and at least one sucking-and-covering unit which covers the recording head and communicates with a suction-generating unit,
wherein the black ink is supplied to one of the plurality of the nozzle arrays of the recording head, and the color ink is supplied to the other plurality of the nozzle arrays of the recording head,
wherein the black ink includes:
resin-coated carbon-black particles including carbon black and a resin existing on a surface of the carbon black;
surfactant-treated carbon-black particles including carbon black and a surfactant existing on a surface of the carbon black; and
water,
wherein the color ink includes:
resin-coated color-pigment particles including a color pigment a resin existing on a surface of the color pigment;
surfactant-treated color-pigment particles including a color pigment and a surfactant existing on a surface of the color pigment; and
water,
wherein the ink set satisfies Expression (1), Expression (2) and Expression (3) below:

$$5.0\% \text{ by mass} \leq P(Bk) \leq 12.0\% \text{ by mass} \qquad \text{Expression (1)}$$

$$3.0\% \text{ by mass} \leq P(CL) \leq 10.0\% \text{ by mass} \qquad \text{Expression (2)}$$

$$[R(CL)/S(CL)] < [R(Bk)/S(Bk)] \qquad \text{Expression (3)}$$

where, in Expression (1), P(Bk) represents a carbon black concentration of the black ink; in Expression (2), P(CL) represents a pigment concentration of the color ink; in Expression (3), R(Bk) represents a mass ratio of the carbon black in the resin-coated carbon-black particles to the carbon black in the black ink, S(Bk) represents a mass ratio of the carbon black in the surfactant-treated carbon-black particles to the carbon black in the black ink, R(CL) represents a mass ratio of the color pigment in the resin-coated color-pigment particles to the color pigment in the color ink, and S(CL) represents a mass ratio of the color pigment in the surfactant-treated color-pigment particles to the color pigment in the color ink.

<2> The ink set according to <1>, wherein the black ink and the color ink have a viscosity at 25° C. of 5.0 mPa·s to 12.0 mPa·s.

<3> The ink set according to any one of <1> to <2>, wherein the black ink and the color ink include a fluorosurfactant and a silicone surfactant.

<4> The ink set according to any one of <1> to <3>, wherein the ink set satisfies Expression (4) and Expression (5) below:

$$7.0\% \text{ by mass} \leq P(Bk) \leq 10.0\% \text{ by mass} \qquad \text{Expression (4)}$$

$$4.0\% \text{ by mass} \leq P(CL) \leq 9.0\% \text{ by mass} \qquad \text{Expression (5).}$$

<5> The ink set according to any one of <1> to <4>, wherein the ink set satisfies Expression (3') below:

$$0.01 < [R(CL)/S(CL)] < [R(Bk)/S(Bk)] < 100 \qquad \text{Expression (3').}$$

<6> The ink set according to any one of <1> to <5>, wherein the ink set satisfies Expression (6) and Expression (7) below:

$$0.02 < [R(CL)/S(CL)] < 1.00 \qquad \text{Expression (6)}$$

$$1.00 < [R(Bk)/S(Bk)] < 10.00 \qquad \text{Expression (7).}$$

<7> The ink set according to any one of <1> to <6>, wherein the black ink and the color ink include a water-soluble organic solvent.

<8> An inkjet recording method, including:
flying an ink, wherein a stimulus is applied to each ink in the ink set according to any one of <1> to <7> to fly the ink and to form an image.

This application claims priority to Japanese application No. 2012-091660, filed on Apr. 13, 2012 and incorporated herein by reference.

What is claimed is:
1. An ink set, comprising:
a black ink; and
a color ink,
wherein the ink set is used in an inkjet recording apparatus, comprising: a recording head which comprises a plurality of nozzle arrays, each comprising a plurality of nozzles; and at least one sucking-and-covering unit which covers the recording head and communicates with a suction-generating unit, wherein the black ink is supplied to one of the plurality of the nozzle arrays of the recording head, and the color ink is supplied to the other plurality of the nozzle arrays of the recording head, wherein the black ink comprises:

resin-coated carbon-black particles comprising carbon black and a resin existing on a surface of the carbon black;

surfactant-treated carbon-black particles comprising carbon black and a surfactant existing on a surface of the carbon black; and water, wherein the color ink comprises:

resin-coated color-pigment particles comprising a color pigment a resin existing on a surface of the color pigment;

surfactant-treated color-pigment particles comprising a color pigment and a surfactant existing on a surface of the color pigment; and water, wherein the ink set satisfies Expression (1), Expression (2), Expression (3), Expression (6), and Expression (7) below:

$$5.0\% \text{ by mass} \leq P(Bk) \leq 12.0\% \text{ by mass} \quad \text{Expression (1)}$$

$$3.0\% \text{ by mass} \leq P(CL) \leq 10.0\% \text{ by mass} \quad \text{Expression (2)}$$

$$[R(CL)/S(CL)] < [R(Bk)/S(Bk)] \quad \text{Expression (3)}$$

$$0.02 < [R(CL)/S(CL)] < 1.00 \quad \text{Expression (6)}$$

$$1.00 < [R(Bk)/S(Bk)] < 10.00 \quad \text{Expression (7)}$$

where, in Expression (1), P(Bk) represents a carbon black concentration of the black ink; in Expression (2), P(CL) represents a pigment concentration of the color ink; in Expression (3), Expression (6), and Expression (7), R(Bk) represents a mass ratio of the carbon black in the resin-coated carbon-black particles to the carbon black in the black ink, S(Bk) represents a mass ratio of the carbon black in the surfactant-treated carbon-black particles to the carbon black in the black ink, R(CL) represents a mass ratio of the color pigment in the resin-coated color-pigment particles to the color pigment in the color ink, and S(CL) represents a mass ratio of the color pigment in the surfactant-treated color-pigment particles to the color pigment in the color ink.

2. The ink set according to claim 1, wherein the black ink and the color ink have a viscosity at 25° C. of 5.0mPa·s to 12.0mPa·s.

3. The ink set according to claim 1, wherein the black ink and the color ink comprise a fluorosurfactant and a silicone surfactant.

4. The ink set according to claim 1, wherein the ink set satisfies Expression (4) and Expression (5) below:

$$7.0\% \text{ by mass} \leq P(Bk) \leq 10.0\% \text{ by mass} \quad \text{Expression (4)}$$

$$4.0\% \text{ by mass} \leq P(CL) \leq 9.0\% \text{ by mass} \quad \text{Expression (5).}$$

5. The ink set according to claim 1, wherein the ink set satisfies Expression (3') below:

$$0.01 < [R(CL)/S(CL)] < [R(Bk)/S(Bk)] < 100 \quad \text{Expression (3').}$$

6. The ink set according to claim 1, wherein the black ink and the color ink comprise a water-soluble organic solvent.

7. An inkjet recording method, comprising:

flying an ink, wherein a stimulus is applied to each ink in an ink set to fly the ink and to form an image, wherein the ink set comprises:

a black ink; and a color ink, wherein the ink set is used in an inkjet recording apparatus, comprising: a recording head which comprises a plurality of nozzle arrays, each comprising a plurality of nozzles; and at least one sucking-and-covering unit which covers the recording head and communicates with a suction-generating unit, wherein the black ink is supplied to one of the plurality of the nozzle arrays of the recording head, and the color ink is supplied to the other plurality of the nozzle arrays of the recording head, wherein the black ink comprises:

resin-coated carbon-black particles comprising carbon black and a resin existing on a surface of the carbon black;

surfactant-treated carbon-black particles comprising carbon black and a surfactant existing on a surface of the carbon black; and water, wherein the color ink comprises:

resin-coated color-pigment particles comprising a color pigment a resin existing on a surface of the color pigment;

surfactant-treated color-pigment particles comprising a color pigment and a surfactant existing on a surface of the color pigment; and water, wherein the ink set satisfies Expression (1), Expression (2) and Expression (3) below:

$$5.0\% \text{ by mass} \leq P(Bk) \leq 12.0\% \text{ by mass} \quad \text{Expression (1)}$$

$$3.0\% \text{ by mass} \leq P(CL) \leq 10.0\% \text{ by mass} \quad \text{Expression (2)}$$

$$[R(CL)/S(CL)] < [R(Bk)/S(Bk)] \quad \text{Expression (3)}$$

where, in Expression (1), P(Bk) represents a carbon black concentration of the black ink; in Expression (2), P(CL) represents a pigment concentration of the color ink; in Expression (3), R(Bk) represents a mass ratio of the carbon black in the resin-coated carbon-black particles to the carbon black in the black ink, S(Bk) represents a mass ratio of the carbon black in the surfactant-treated carbon-black particles to the carbon black in the black ink, R(CL) represents a mass ratio of the color pigment in the resin-coated color-pigment particles to the color pigment in the color ink, and S(CL) represents a mass ratio of the color pigment in the surfactant-treated color-pigment particles to the color pigment in the color ink.

8. The inkjet recording method according to claim 7, wherein the black ink and the color ink have a viscosity at 25° C. of 5.0mPa·s to 12.0mPa·s.

9. The inkjet recording method according to claim 7, wherein the black ink and the color ink comprise a fluorosurfactant and a silicone surfactant.

10. The inkjet recording method according to claim 7, wherein the ink set satisfies Expression (4) and Expression (5) below:

$$7.0\% \text{ by mass} \leq P(Bk) \leq 10.0\% \text{ by mass} \quad \text{Expression (4)}$$

$$4.0\% \text{ by mass} \leq P(CL) \leq 9.0\% \text{ by mass} \quad \text{Expression (5).}$$

11. The inkjet recording method according to claim 7, wherein the ink set satisfies Expression (3') below:

$$0.01 < [R(CL)/S(CL)] < [R(Bk)/S(Bk)] < 100 \quad \text{Expression (3').}$$

12. The inkjet recording method according to claim 7, wherein the ink set satisfies Expression (6) and Expression (7) below:

$$0.02 < [R(CL)/S(CL)] < 1.00 \qquad \text{Expression (6)}$$

$$1.00 < [R(Bk)/S(Bk)] < 10.00 \qquad \text{Expression (7).}$$

13. The inkjet recording method according to claim 7, wherein the black ink and the color ink comprise a water-soluble organic solvent.

* * * * *